US009497111B2

United States Patent
Lu et al.

(10) Patent No.: US 9,497,111 B2
(45) Date of Patent: *Nov. 15, 2016

(54) COMMUNICATIONS METHOD AND SYSTEM FOR COMMUNICATIONS OF NETWORK ACCESSING EQUIPMENT

(75) Inventors: Dorian Lu, Shanghai (CN); Carl Yang, Beijing (CN)

(73) Assignee: BEIJING QIANTANG NETWORK TECHNOLOGY COMPANY, LTD., Beijing (CN)

( * ) Notice: Subject to any disclaimer, the term of this patent is extended or adjusted under 35 U.S.C. 154(b) by 473 days.

This patent is subject to a terminal disclaimer.

(21) Appl. No.: 13/814,732

(22) PCT Filed: Aug. 4, 2011

(86) PCT No.: PCT/CN2011/077989
§ 371 (c)(1),
(2), (4) Date: Apr. 12, 2013

(87) PCT Pub. No.: WO2012/016529
PCT Pub. Date: Feb. 9, 2012

(65) Prior Publication Data
US 2013/0188519 A1   Jul. 25, 2013

(30) Foreign Application Priority Data
Aug. 6, 2010 (CN) .......................... 2010 1 0248220

(51) Int. Cl.
*H04L 12/725* (2013.01)
*H04L 12/64* (2006.01)
*H04L 12/437* (2006.01)

(52) U.S. Cl.
CPC ........... *H04L 45/306* (2013.01); *H04L 12/437* (2013.01); *H04L 12/6418* (2013.01)

(58) Field of Classification Search
None
See application file for complete search history.

(56) References Cited

U.S. PATENT DOCUMENTS 6,411,617 B1   6/2002   Kikki et al.
6,614,781 B1 *  9/2003   Elliott et al. .................. 370/352
(Continued)

FOREIGN PATENT DOCUMENTS

CN   1275299 A   11/2000
CN   1373980 A   10/2002
(Continued)

OTHER PUBLICATIONS

First Office Action of Chinese Application No. 201010248220.8 dated Oct. 14, 2014, along with English translation of Text of First Office Action, 5 pages.
(Continued)

*Primary Examiner* — Noel Beharry
*Assistant Examiner* — Rodrick Mak
(74) *Attorney, Agent, or Firm* — Foley & Lardner LLP

(57) ABSTRACT

A method for communication link for an access network device. The access network device comprises: a node server, an access switch, and a terminal. The method comprises: the node server requesting for a protocol packet on the basis of a service initiated by the source terminal; acquiring a piece of communication link information of the current service, and the communication link information comprises a piece of communication port information for the node server and the access switch involved in the current service; on the basis of the communication port information for the node server, the node server setting up within an internal data packet address table the port directed by the data packet of the current service; on the basis of the communication port information for the access switch, transmitting to the corresponding accessing switch a port configuration command; on the basis of the port configuration command, the accessing switch setting up the port directed by the data packet of the current service within an internal data packet address table. By means of the present invention, the stability of a transmission channel is ensured, thereby avoiding delays for multimedia services.

17 Claims, 4 Drawing Sheets

(56) References Cited

U.S. PATENT DOCUMENTS

| | | | |
|---|---|---|---|
| 6,944,150 B1* | 9/2005 | McConnell et al. | 370/352 |
| 7,346,063 B1* | 3/2008 | Herbst | 370/395.7 |
| 7,409,712 B1* | 8/2008 | Brooks et al. | 726/22 |
| 7,474,660 B1* | 1/2009 | Pearce | H04L 12/4625 370/395.3 |
| 7,809,015 B1 | 10/2010 | Willis et al. | |
| 2003/0088696 A1* | 5/2003 | McCanne | 709/238 |
| 2007/0121503 A1* | 5/2007 | Guo | H04L 12/5695 370/230 |
| 2008/0144642 A1* | 6/2008 | Song | H04L 12/66 370/401 |
| 2012/0054349 A1* | 3/2012 | Chandrasekaran et al. | 709/227 |
| 2014/0112122 A1* | 4/2014 | Kapadia | H04L 45/74 370/219 |

FOREIGN PATENT DOCUMENTS

| | | |
|---|---|---|
| CN | 101547194 | 9/2009 |
| CN | 101917492 A | 12/2010 |
| WO | WO 2007/070773 A2 | 6/2007 |

OTHER PUBLICATIONS

First Office Action of Chinese Application No. 202019247237.3 dated Aug. 23, 2013, along with English translation of Text of First Office Action, 5 pages.

* cited by examiner

COMMUNICATIONS METHOD AND SYSTEM FOR COMMUNICATIONS OF NETWORK ACCESSING EQUIPMENT

FIELD OF THE INVENTION

The present invention relates to the technical field of novel networks, and in particular, to a communication connection method for an access network device, a communication connection system for an access network device, a node server and an access switch.

BACKGROUND OF THE INVENTION

Novel networks (including Internet) enable the exchange of information and other information resources between different individuals and organizations. Generally, a network concerns the technologies of path, transmission, signaling and network management, etc. Such technologies have been widely set forth in various documents among which *Telecommunications Convergence* (McGraw-Hill, 2000) by Steven Shepherd, *The Essential Guide to Telecommunications*, Third Edition (Prentice Hall PRT, 2001) by Annabel Z. Dodd, or *Communications Systems and Networks*, Second Edition (M&T Books, 2000) by Ray Horak gives an overview of the technologies. The progression in such technologies obtained in the past has fully built up the speed and quality of information transmission and lowered the cost thereof.

The path technology for connecting a terminal to a wide area transmission network (for example, a local area loop of a terminal apparatus and the network edge) has been developed from a modem of 14.4, 28.8 and 56K to technologies including ISDN, T1, cable modem, DSL, Ethernet and wireless connection.

At present, transmission technologies used in a wide area network include: synchronous optical network (SONET), Dense Wavelength Division Multiplexing (DWDM), Frame Relay, Asynchronous Transmission Mode (ATM) and Resilient Packet Ring (RPR).

Among all the different signaling technologies (for example, protocols and methods for establishing, maintaining and terminating a communication in a network), Internet Protocol (IP) is applied most widely. In fact, almost all the communication and network specialists consider that an IP-based network (for example, Internet) that integrates audio (for example, telephone), video and data networks is an inevitable trend. Just as described by an author: there's one thing that is clear, that is, an IP-based train that integrates various networks has drawn out of the station, some passengers are eager in this trip, and others are pulled forward with reluctance and cry, scream, struggle and list all sorts of defects of IP; however, in spite of all the defects thereof, IP has been adopted as a industry standard, and no other technology, except for IP, has such a large potentiality and development space. (Abstracted from *IP Convergence: Building the Future*, by Susan Breidenbach, *Network World*, Aug. 10, 1998).

With the explosive increment of Internet services, the application range thereof has been extended to each field and each industry in the society. In the view point of telecommunication industry, more and more traditional telecommunication services employ IP for transmission, i.e., so-called Everything Over IP. The framework of the current telecommunication network will gradually turn from circuit switching and the networking technology thereof to a new framework based on packet switching, in particular, IP; and services over telecommunication network will turn from telephone service to data service.

TCP/IP Network Protocol

TCP/IP (Transmission Control Protocol/Internet Protocol) is a protocol most widely applied over the world at present, and the prevalence thereof is closely related to the impetuous development of Internet. Originally, TCP/IP is designed for the prototype of Internet, ARPANET, for providing a full set of protocols that are convenient and practical and can be applied on various networks. It is proved by facts that TCP/IP has accomplished its tasks, it makes network interconnection easy, and it enables more and more networks to participate in the network interconnection, thereby becoming a de facto standard of Internet.

Application Layer: application layer is a general term for all applications that users face. On this layer, there exist a lot of protocols from the TCP/IP protocol family to support different applications, and the implementation of many familiar Internet-based applications cannot be separated from these protocols. For example, HTTP protocol used in World Wide Web (WWW) access, FTP protocol used in file transmission, SMTP used in e-mail sending, DNS protocol used in domain name resolution, Telnet protocol used in remote logon and so on all belong to TCP/IP on the application layer; for users, patterned operating interfaces constructed by software are seen, but in fact, the above protocols are operated in the background.

Transmission Layer: the function of this layer is mainly to provide communication between applications, and on this layer, protocols from the TCP/IP protocol family include TCP and UDP.

Network Layer: network layer is a very crucial layer in the TCP/IP protocol family, which mainly defines the format of IP address, thereby data of different application types can be transmitted on the Internet smoothly, and IP protocol is a network layer protocol.

Network Interface Layer: this is the lowest layer of TCP/IP software, which is responsible for receiving an IP packet and sending it via a network, or receiving a physical frame from a network, extracting an IP datagram and delivering it to an IP layer.

How does IP implement network interconnection? Network systems and devices manufactured by various manufacturers, for example, Ethernet and packet switching network, etc., cannot intercommunicate with each other, the main reason is that the formats of the basic units (technically referred to as "frames") of data transmitted by them are different. In fact, IP protocol is a set of protocol software consisted of software programs, and it unitedly converts various different "frames" into the format of "IP packet", such conversion is a most important feature of Internet, i.e., a feature of "openness", which makes all computers able to realize intercommunication on the Internet.

Then, what is "data packet"? And what feature does it have? Data packet is also a form of packet switching, that is, data to be transmitted are segmented into "packets" and then transmitted out. However, it belongs to "connectionless type", that is, each "packet" is transmitted out as an "independent message", so it is called "data packet". Thus, before communication starts, no circuit needs to be connected first, and respective packets will not necessarily be transmitted via one and the same route, so it is called "connectionless type". Such a feature is very important, and in the case of text information transmission, it greatly improves the robustness and security of the network.

Each data packet has two parts, header and message. Header contains necessary contents such as destination address, etc., so that each data packet can correctly reach its destination via different routes. At the destination, the data packets recombine and restore to the data sent originally. This requires that IP has the functions of packet packaging and assembling.

During the practical transmission process, a data packet also needs to change the data packet length according to the packet size specified by the network it passes, the maximum length of an IP data packet may reach 65535 bytes.

Quality of Service (QoS) is a main problem of IP Internet. Through the ages, countless research reports try to solve this problem; however, if we arrange the main milestones of QoS in time order, it will be readily seen that this is a helpless history in which QoS of Internet continuously lowers its requirements and continuously fails. From "Inte Serv" (1990) to "Diff Serv" (1997) and then to "Lightload" (2001), the summation of various partial QoS improving solutions that seem effective is still far from the target of network-wide QoS. QoS seems nearby, but in fact it's too far away to reach.

At the early stage of IP Internet, video application has become a target of network service, for example, MBone. Due to the lack of an effective QoS, no video communication service with a commercial value can be developed in a long term, which weakens the profit-earning capacity of IP Internet. Therefore, it has a great commercial value to solve the quality problem of network transmission. The quality problem of network transmission specifically appears as packet loss and error code. Computer files are not sensitive to errors in transmission; so long as there exists a TCP retransmission mechanism, a computer may consider the network as usable even if a great part of data packets are lost during the transmission process. However, if packet loss rate and error code rate are higher than 1/1,000, the quality of video and audio will be lowered for synchronous video. Empirical data tells us that high-quality video communication even requires that packet loss and error code should be lower than 1/100,000. Test data from the current network environment show that most packet loss occurs inside a router, and error codes generated during optical fiber transmission may almost be neglected.

Why can't "Inte Serv" succeed?

"Inte Serv" is established on the basis of reserved independent stream resources by employing Resource Reservation SetupProtocol (RSVP). In large-scale network environment, if a part of bandwidth resources can be reserved between two video terminals, it may be specially used by the video service; however, although this sounds good, it is impracticable in fact.

Firstly, this solution requires network-wide device reconstruction, which equals to reestablishing the network, and it is almost impossible in practical operation.

Next, even if network-wide reconstruction is implemented, for example, a bandwidth of 2 Mbps is kept for a 2 Mbps video service in each switch, can QoS problem be solved? The answer is No.

The so-called 2 Mbps bandwidth of RSVP is only considered macroscopically, if data in one second is sent in the first half second centralizedly, a problem will arise and periodic burst flow will be formed. Because the core concept of IP Internet is "Best Efforts", at each network node, the switch always tries its best to forward data at the highest speed. After a video stream passes multiple levels of switches, it will be certain that flow distribution becomes non-uniform. When multiple non-uniform and asynchronous streams are combined, greater non-uniformity will be generated in a period of time; that is, periodic congestion of network flow is certain to appear. With the increasing of video user numbers, no upper limit can be given to periodic congestion, and when it exceeds the internal storage capacity of the switch, packet loss will be directly caused.

Why does "Diff Serv" fail?

After "Inte Serv" made its appearance for 7 years, a novel method "Diff Serv" starts to prevail. "Diff Serv" tries to provide a network service being superior to "Best Efforts". Such a method does not require complex network-wide resource reservation, and it is easy to implement. It only needs to put a "priority" label on each data packet and the network switch processes video data with "priority" first. The basic theory thereof is just like that a bank issues a gold card to a VIP client and the queuing time of a high-end client may be effectively reduced. This method also sounds good, but in fact, it is impracticable, too.

There exists one easy fact that cannot be ignored: the flow of a single video service is much larger than that of a traditional non-video service (over a hundredfold).

When there are a few video users, video data packets will be seen almost everywhere on the network. If most of the data packets have a "gold card", VIP is meaningless. Additionally, because IP interconnection network management is not compulsory, although QoS has drawn up a set of moral standards for users that maintain their personal integrity during chaotic times, it is unpractical to require all the users to carry the standards into effect.

Therefore, "Diff Serv" is only effective in a few enterprise private networks, and it is difficult to be effectively popularized in large-scale public networks.

Why can't "Light load" succeed?

Since IP Internet was popularized step by step, people have been unremittingly seeking after an effective prescription for network QoS. After more than 10 years' brain squeeze, network technicians work out two QoS solutions, but neither is ideal. Under the macro-environment in which people loose confidence in solving QoS, some anonymous people put forward a method, i.e., "Light load". The basic design consideration thereof is so-called light-load network, and it is considered that so long as a sufficient bandwidth is provided and optical fiber enters users' houses, there should be no need to worry about network congestion.

Is the design consideration of light-load network feasible? The answer is also No.

The current network technicians seem to miss a basic theory: the root of network packet loss phenomenon is flow non-uniformity. Macroscopically, when the sending speed is high in one time period, it is certain to cause jam in another time period; no upper limit can be given to the peak flow of the network so long as the network flow is non-uniform, and any arbitrary large bandwidth may be occupied in a short time.

Actually, a reasonably good video program may be transmitted so long as there exists a bandwidth of 2 Mbps; if a bandwidth of 8 Mbps is provided, a video content of HDTV quality may be transmitted. However, if we randomly browse a text or a picture on an ordinary web site, the instantaneous flow will be tens of folds of that of HDTV, because most of the current web site servers use a Gigabit network interface. If the flows of a lot of similar web sites just collide, the burst flow generated in a certain short time will exceed the flow required by all network-wide users that use HDTV, and a network with any bandwidth can be occupied. As shown by statistical analysis, such a collision is frequent.

IP Internet tries to absorb the instantaneous flow by employing a memory, which causes the increase of transmission delay. The storage capacity is limited, but the burst flow has no upper limit; therefore, by employing the memory method, it can only improve the packet loss of the current device, and the burst flow absorbed at the current node will put much pressure on the next node. Video stream flow is ceaseless, and the storage mode of the switch intensifies the accumulation of the burst flow to a weak node, thus network packet loss is inevitable.

By employing light load plus "Diff Serv" technology, the current network constructors may deal with narrowband VoIP voice services. This is because voice does not occupy the main part of total flow on the network; once jam occurs, voice will take priority by sacrificing computer files. However, for high-bandwidth video communication, only temporary improvement can be obtained by partial expansion. If expansion is also carried out at other nodes, the non-uniformity of network flow will increase therewith, so that the effect of the originally expanded part will be lowered. If expansion is carried uniformly network wide, the transmission quality will return to that before expansion. In other words, overall expansion is ineffective.

At preset, device manufacturers recommend ultra-wideband access networks of tens or even hundreds of Megabit to each household. However, even if optical fiber enters each household, it is difficult to exhibit a video communication service with good QoS to the consumers. In spite of what complex QoS measures are taken, the transmission quality of IP Internet can only be "improved", and no quality of network transmission can be "guaranteed".

SUMMARY OF THE INVENTION

The technical problem to be solved in the present invention is to provide a communication connection method for an access network device, so as to guarantee the stability and smoothness of transmission channels, avoid the delays for multimedia services, meet the requirements for the state information security and save hardware resources, thereby guaranteeing the quality of the network transmission.

The embodiments of the invention further provides a communication connection system for an access network device, a node server and an access switch, so as to guarantee the implementation and application of the above method in practice.

In order to solve the above technical problems, an embodiment of the invention discloses a communication connection method for an access network device, wherein the access network device includes a node server, an access switch and a terminal, and the method comprises the following steps:

acquiring, by the node server, communication link information of current service according to a service request protocol packet initiated by a source terminal, wherein the communication link information includes communication port information of the access switch which participates in the current service;

transmitting, by the node server, a port configuration command to the corresponding access switch according to the communication port information of the access switch; and setting, by the access switch, in its internal data packet address table, a port to which a data packet of the current service is oriented, according to the port configuration command.

Preferably, the communication link information further includes communication port information of the node server which participates in the current service, and at this time, the node server can set, in its internal data packet address table, a port to which the data packet of the current service is oriented.

Wherein if the source terminal and the target terminal are connected to one and the same access switch, the node server may only configure a data packet orientation port of the access switch, and when service communication is carried out between the source terminal and the target terminal, the access switch transmits a data packet directly via a corresponding downlink port of the access switch according to settings of an internal data packet address table; that is, the source terminal and the target terminal may directly carry out service communication under the access switch to which they are connected jointly, rather than uploading the data packet to the node server and then issuing the data packet to the corresponding terminal by the node server, thereby bandwidth and route resources may be saved effectively.

Through the above steps, the communication link of the current service has been configured. In the embodiments of the invention, the access network device refers to the device of the access network part in the novel network. The novel network has a network structure that is controlled centralizedly. It may be the types of tree network, star network and ring network, etc.; but on this basis, a centralized control node is needed on the network to control the whole network. Devices on the access network part mainly may be mainly divided into 3 categories: a node server, an access switch and a terminal (including various set-top boxes, code plates and storages, etc.). Wherein, a node server is a node on the access network that has a centralized control function, and it can control the access switch and the terminal. The node server may be directly connected with the access switch, and it may be directly connected with the terminal.

In practice, the communication connection method in the embodiment of the invention not only applies to multicast communication but also applies to unicast communication, that is, the service request initiated by the source terminal includes a unicast communication service request and a multicast communication service request, and accordingly, the data packet address table includes a unicast data packet address table and a multicast data packet address table.

In the case of performing the unicast communication service, the step of acquiring, by the node server, the communication link information of the current service can comprises the following substeps:

obtaining, by the node server, the service request protocol packet initiated by the source terminal for establishing unicast communication service with a target terminal, wherein the service request protocol packet includes service type information, service content information and an access network address of the source terminal, wherein the service content information includes a service number;

extracting, by the node server, an access network address of the target terminal from a preset content-address mapping table according to the service number; and acquiring, by the node server, the communication link information of the current service according to the service type information, the access network address of the source terminal and the access network address of the target terminal.

For the unicast communication service, the communication link information can be unidirectional communication link information, for example, the source terminal initiates a unicast service request to the target terminal or the target terminal initiates a unicast service request to the source terminal; alternatively, the communication link information can be bidirectional communication link information, for example, the source terminal and the target terminal initiate the unicast service request to each other.

In the process of establishing the communication connection, the node server would inform the source terminal and the target terminal, and judge whether the current communication link can be used according to the reply of the target terminal, that is, in a preferred embodiment of the invention, the step of acquiring, by the node server, the communication link information of the current service further comprises the following substeps:

transmitting, by the node server, a menu protocol packet to the source terminal and the target terminal; and receiving a reply protocol packet transmitted from the target terminal for the menu protocol packet.

In particular, the step of acquiring, by the node server, the communication link information of the current service further comprises the following substeps:

orienting the menu protocol packet to the source terminal according to settings of a preset protocol packet address table in an access switch between the node server and the source terminal; and orienting the menu protocol packet to the target terminal according to settings of a preset protocol packet address table in an access switch between the node server and the target terminal;

wherein the protocol packet address table is set with a CPU module, to which a protocol packet with a destination address being an access network address of the current access switch is oriented, and a port, to which a protocol packet with a destination address being an address of another access network device is oriented.

That is, the node server can transmit the menu protocol packet to the source terminal and the target terminal based on settings of the preset protocol packet address table.

For the establishing of unicast service communication connection, the node server could that the data packet address table set currently is a unicast data packet address table according to the service type information.

Because the node server functions as the main control node on the access network, and a unicast service communication only relates to the downlink port of the node server, the port, to which a unicast data packet of the current service is oriented and which is set by the node server in its internal unicast data packet address table, includes:

a downlink port to which a unicast data packet with a destination address being the source terminal is oriented; and a downlink port to which a unicast data packet with a destination address being the target terminal is oriented.

The node server informs the access switch of configuring the table in the two following ways:

1) when the communication link information is unidirectional communication link information, the communication port information of the access switch includes uplink port information of the access switch in an uplink and downlink port information of the access switch in a downlink;

the port, to which the unicast data packet of the current service is oriented and which is set by the access switch in its internal unicast data packet address table according to the port configuration command, includes:

an uplink port of the access switch in the uplink and a downlink port of the access switch in the downlink to which a unicast data packet with a destination address being the target terminal is oriented.

2) when the communication link information is bidirectional communication link information, the communication port information of the access switch includes uplink port and downlink port information of the access switch in an uplink and uplink port and downlink port information of the access switch in a downlink;

the port, to which the unicast data packet of the current service is oriented and which is set by the access switch in its internal unicast data packet address table according to the port configuration command, includes:

an uplink port and a downlink port of the access switch in the uplink to which a unicast data packet with a destination address being the target terminal is oriented; and an uplink port and a downlink port of the access switch in the downlink to which a unicast data packet with a destination address being the source terminal is oriented.

In a specific implementation, when transmitting the port configuration command to the access switch, the node server can further transmit a service processing command, such as a encoding and decoding command, to the source terminal and the target terminal respectively, and the source terminal and the target terminal perform corresponding operations according to the service processing command.

In the case of performing the multicast communication service, the step of acquiring, by the node server, the communication link information of the current service can comprises the following substeps:

obtaining, by the node server, a service request protocol packet initiated by the target terminal for requesting multicast communication service, wherein the service request protocol packet includes service type information, service content information and an access network address of the target terminal, wherein the service content information includes a service number;

extracting, by the node server, an access network address of the source terminal from a preset content-address mapping table according to the service number; and acquiring, by the node server, a multicast address corresponding to the source terminal, and allocating the multicast address to the target terminal; and acquiring the communication link information of the current multicast service according to the service type information, the access network address of the source terminal and the access network address of the target terminal.

In practice, the multicast data packet can be transmitted from the source terminal, and in this case, the step of acquiring, by the node server, the communication link information of the current service can comprises the following substeps:

obtaining, by the node server, a service request protocol packet submitted by the source terminal for initiating multicast communication service, and allocating a multicast address to the source terminal according to the service request protocol packet, wherein the service request protocol packet includes service type information, service content information and an access network address of the source terminal, wherein the service content information includes a service number; and acquiring uplink communication link information of the current multicast service according to the service type information and the access network addresses of the node server and the source terminal.

There may be a kind of multicast service that the source terminal also receives the multicast data packet when transmitting the multicast data packet, and in this case, the step of acquiring, by the node server, the communication link information of the current service can comprises the following substeps:

acquiring downlink communication link information of the current multicast service according to the service type information and the access network addresses of the node server and the source terminal.

In practice, the node server can determine that the data packet address table set currently is a multicast data packet address table according to the service type information.

Because the node server functions as the main control node on the access network, and a multicast service communication only relates to the downlink port of the node server, the port, to which a multicast data packet of the current service is oriented and which is set by the node server in its internal multicast data packet address table, includes:

a downlink port to which a multicast data packet with a destination address being the multicast address is oriented.

As an embodiment of the multicast service, the communication port information of the access switch acquired by the node server includes uplink port information of the access switch in an uplink and downlink port information of the access switch in a downlink;

the port, to which a multicast data packet of the current service is oriented and which is set by the access switch in its internal multicast data packet address table according to the port configuration command, includes:

an uplink port of the access switch in the uplink and a downlink port of the access switch in the downlink to which a multicast data packet with a destination address being the multicast address is oriented.

As another embodiment of the multicast service, the communication port information of the access switch acquired by the node server can further includes downlink port information of the access switch in an uplink;

the port, to which a multicast data packet of the current service is oriented and which is set by the access switch in its internal multicast data packet address table according to the port configuration command, includes:

a downlink port of the access switch in the uplink to which a multicast data packet with a destination address being the multicast address is oriented.

In a specific implementation, preferably, the port configuration command is recorded in a protocol packet, and the node server orients the protocol packet to a corresponding access switch by connecting to a downlink port of the corresponding access switch according to settings of a downlink protocol packet address table preset internally;

wherein the downlink protocol packet address table is set with a downlink port to which a protocol packet with a destination address being an address of a subordinate access network device is oriented.

In a specific implementation, when transmitting the port configuration command to the access switch, the node server can further transmit a service processing command to the target terminal and the target terminal performs a corresponding operation according to the service processing command; or the node server can further transmit a service processing command to the source terminal and the source terminal performs a corresponding operation according to the service processing command.

If the node server obtains currently many pieces of communication link information of the current service, then the node server can select one piece of communication link information therefrom as the communication link information of the current service according to a preset rule. As a preferred embodiment of the invention, the preset rule can be that the node server acquires flow information of each communication link and flow information of the current service, and determines the information of a communication link with the minimum flow used as the communication link information of the current service; or the preset rule can also be that the node server acquires bandwidth information of each communication link and bandwidth information of the current service, and determines the information of a communication link with the maximum bandwidth as the communication link information of the current service.

In an embodiment of the invention, preferably, the service request protocol packet initiated by the source terminal is oriented to the node server via an uplink port of the corresponding access switch according to settings of an uplink protocol packet address table preset in the access switch connected between the source terminal and the node server;

wherein the uplink protocol packet address table is set with an uplink port to which a protocol packet with a destination address being the address of the node server is oriented.

In order to save sources, the node server can release the port, to which the data packet of the current service is oriented and which is set in its internal data packet address table, after the current service is completed, and transmit a port release command to the access switch that participates in the current service; and the access switch release the port, to which the data packet of the current service is oriented and which is set in its internal data packet address table, according to the port release command.

Preferably, the node server further transmits a service ending command to the source terminal and/or the target terminal; and ending, by the source terminal and/or the target terminal, the service processing according to the service ending command.

In order to manage and control centrally the access network address well, the node server is further set with an address information table therein, wherein address occupation information, device identification information and device resource information are recorded in the address information table.

After the current service is completed, the node server would modify contents in the preset address information table, wherein the modifying includes: updating the address occupation information in the corresponding item of the released port as not occupied; and updating the corresponding device identification information and device resource information.

In the embodiment of the invention, the access network device can access the novel network by the following steps:

setting, by the access switch, a CPU module, to which all downlink protocol packets are oriented, in its internal downlink protocol packet address table when being powered on;

receiving, by the access switch, a downlink protocol packet transmitted from the node server and orienting the downlink protocol packet to the CPU module of the access switch according to settings of the downlink protocol packet address table; and generating, by the CPU module, an uplink protocol packet and transmitting the uplink protocol packet to the node server, wherein the downlink protocol packet contains an access network address to be allocated;

transmitting, by the node server, a network access command to the access switch, wherein the network access command contains an access network address of the access switch, and the access network address is the access network address to be allocated in the downlink protocol packet received by the access switch; and updating, by the access switch, its internal downlink protocol packet address table as that only a protocol packet with a destination address being its own access network address is oriented to the CPU module.

In a specific implementation, the access switch generally further connects to other subordinate access network devices, and in this case, the node server transmits a port allocation packet to the access switch which has accessed the network, that is, as a preferred embodiment of the invention, when the access switch which has accessed the network receives a port allocation packet transmitted from the node server, the method further comprises:

orienting, by the access switch which has accessed the network, the port allocation packet with a destination address being its own access network address to the CPU module; and setting, in its internal downlink protocol packet address table, a downlink port to which each port downlink protocol packet is oriented according to port allocation information in the packet.

Furthermore, when the access switch which has accessed the network receives a port downlink protocol packet transmitted from the node server, the method further comprises:

orienting, by the access switch, the port downlink protocol packet to a corresponding downlink port according to settings of its internal downlink protocol packet address table, wherein the port downlink protocol packet contains an access network address to be allocated;

receiving, by the node server, a port uplink protocol packet transmitted from a certain subordinate access network device connected to a downlink port of the access switch, and transmitting a network access command to the subordinate access network device, wherein the network access command contains an access network address of the subordinate access network device, and the access network address is the access network address to be allocated in the port downlink protocol packet received by the subordinate access network device.

An embodiment of the invention further discloses a communication connection system for an access network device, wherein the access network device includes a node server, an access switch and a terminal, and the node server comprises:

a service request receiving module configured to receive a service request protocol packet initiated by a source terminal;

a communication link acquiring module configured to acquire communication link information of current service according to the service request protocol packet initiated by the source terminal, wherein the communication link information includes communication port information of the access switch which participates in the current service; and a switch port configuration module configured to transmit a port configuration command to the corresponding access switch according to the communication port information of the access switch;

and the access switch comprises:

an address table configuration module configured to set, in its internal data packet address table, a port to which a data packet of the current service is oriented, according to the port configuration command.

Preferably, the communication link information further includes communication port information of the node server which participates in the current service, and at this time, the node server further comprises an address table configuration module configured to set, in its internal data packet address table, a port to which the data packet of the current service is oriented according to the communication port information of the node server.

In practice, the communication connection method in the embodiment of the invention not only applies to multicast communication but also applies to unicast communication, that is, the service request initiated by the source terminal includes a unicast communication service request and a multicast communication service request, and accordingly, the data packet address table includes a unicast data packet address table and a multicast data packet address table.

In the case of performing the unicast communication service, the communication link acquiring module of the node server comprises:

a unicast service protocol packet receiving submodule configured to receive the service request protocol packet initiated by the source terminal for establishing unicast communication service with a target terminal, wherein the service request protocol packet includes service type information, service content information and an access network address of the source terminal, wherein the service content information includes a service number;

a target terminal address acquiring submodule configured to extract an access network address of the target terminal from a preset content-address mapping table according to the service number; and a communication link calculating submodule configured to acquire the communication link information of the current service according to the service type information, the access network address of the source terminal and the access network address of the target terminal.

For the unicast communication service, the communication link information can be unidirectional communication link information, for example, the source terminal initiates a unicast service request to the target terminal or the target terminal initiates a unicast service request to the source terminal; alternatively, the communication link information can be bidirectional communication link information, for example, the source terminal and the target terminal initiate the unicast service request to each other.

In the process of establishing the communication connection, the node server would inform the source terminal and the target terminal, and judge whether the current communication link can be used according to the reply of the target terminal, that is, in a preferred embodiment of the invention, the node server further comprises:

a menu protocol packet transmitting module configured to transmit a menu protocol packet to the source terminal and the target terminal;

a reply protocol packet receiving module configured to receive a reply protocol packet transmitted from the target terminal for the menu protocol packet.

In particular, the access switch comprises a first access switch located between the node server and the source terminal, and a second access switch located between the node server and the target terminal;

the first access switch further comprises:

a first menu protocol packet orienting module configured to orient the menu protocol packet to the source terminal according to settings of its internal preset protocol packet address table;

the second access switch further comprises:

a second menu protocol packet orienting module configured to orient the menu protocol packet to the target terminal according to settings of its internal preset protocol packet address table;

wherein the protocol packet address table is set with a CPU module, to which a protocol packet with a destination address being an access network address of the current access switch is oriented, and a port, to which a protocol packet with a destination address being an address of another access network device is oriented.

That is, the node server can transmit the menu protocol packet to the source terminal and the target terminal based on settings of the preset protocol packet address table.

For the establishing of unicast service communication connection, the node server further comprises:

a unicast address table determining module configured to determine that the data packet address table set currently is a unicast data packet address table according to the service type information.

Because the node server functions as the main control node on the access network, and a unicast service communication only relates to the downlink port of the node server, the port, to which a unicast data packet of the current service is oriented and which is set by the node server in its internal unicast data packet address table, includes:

a downlink port to which a unicast data packet with a destination address being the source terminal is oriented; and a downlink port to which a unicast data packet with a destination address being the target terminal is oriented.

The node server informs the access switch of configuring the table in the two following ways:

1) when the communication link information is unidirectional communication link information, the communication port information of the access switch includes uplink port information of the access switch in an uplink and downlink port information of the access switch in a downlink;

the port, to which the unicast data packet of the current service is oriented and which is set by the access switch in its internal unicast data packet address table according to the port configuration command, includes:

an uplink port of the access switch in the uplink and a downlink port of the access switch in the downlink to which a unicast data packet with a destination address being the target terminal is oriented.

2) when the communication link information is bidirectional communication link information, the communication port information of the access switch includes uplink port and downlink port information of the access switch in an uplink and uplink port and downlink port information of the access switch in a downlink;

the port, to which the unicast data packet of the current service is oriented and which is set by the access switch in its internal unicast data packet address table according to the port configuration command, includes:

an uplink port and a downlink port of the access switch in the uplink to which a unicast data packet with a destination address being the target terminal is oriented; and an uplink port and a downlink port of the access switch in the downlink to which a unicast data packet with a destination address being the source terminal is oriented.

In a specific implementation, the node server further comprises:

a service processing command transmitting module configured to transmit a service processing command to the source terminal and the target terminal respectively;

the source terminal comprises a command executing module configured to perform a corresponding operation according to the service processing command; and the target terminal comprises a command executing module configured to perform a corresponding operation according to the service processing command.

In the case of performing the multicast communication service, the communication link acquiring module of the node server comprises:

a multicast communication request receiving submodule configured to receive a service request protocol packet initiated by the target terminal for requesting multicast communication service, wherein the service request protocol packet includes service type information, service content information and an access network address of the target terminal, wherein the service content information includes a service number;

a source terminal address extracting submodule configured to extract an access network address of the source terminal from a preset content-address mapping table according to the service number;

a first multicast address allocating submodule configured to acquire a multicast address corresponding to the source terminal, and allocate the multicast address to the target terminal; and a multicast request link calculating submodule configured to acquire the communication link information of the current multicast service according to the service type information, the access network address of the source terminal and the access network address of the target terminal.

In practice, the multicast data packet can be transmitted from the source terminal, and in this case, the communication link acquiring module of the node server further comprises:

a multicast communication initiation request receiving submodule configured to receive a service request protocol packet submitted by the source terminal for initiating multicast communication service, wherein the service request protocol packet includes service type information, service content information and an access network address of the source terminal, wherein the service content information includes a service number;

a second multicast address allocating submodule configured to allocate a multicast address to the source terminal according to the service request protocol packet; and an uplink calculating submodule configured to acquire uplink communication link information of the current multicast service according to the service type information and the access network addresses of the node server and the source terminal.

There may be a kind of multicast service that the source terminal also receives the multicast data packet when transmitting the multicast data packet, and in this case, the communication link acquiring module of the node server further comprises:

a downlink calculating submodule configured to acquire downlink communication link information of the current multicast service according to the service type information and the access network addresses of the node server and the source terminal.

In practice, the node server further comprises:

a multicast address table determining module configured to determine that the data packet address table set currently is a multicast data packet address table according to the service type information.

Because the node server functions as the main control node on the access network, and a multicast service communication only relates to the downlink port of the node server, the port, to which a multicast data packet of the current service is oriented and which is set by the node server in its internal multicast data packet address table, includes:

a downlink port to which a multicast data packet with a destination address being the multicast address is oriented.

As an embodiment of the multicast service, the communication port information of the access switch acquired by the node server includes uplink port information of the access switch in an uplink and downlink port information of the access switch in a downlink;

the port, to which a multicast data packet of the current service is oriented and which is set by the access switch in its internal multicast data packet address table according to the port configuration command, includes:

an uplink port of the access switch in the uplink and a downlink port of the access switch in the downlink to which a multicast data packet with a destination address being the multicast address is oriented.

As another embodiment of the multicast service, the communication port information of the access switch acquired by the node server can further includes downlink port information of the access switch in an uplink;

the port, to which a multicast data packet of the current service is oriented and which is set by the access switch in its internal multicast data packet address table according to the port configuration command, includes:

a downlink port of the access switch in the uplink to which a multicast data packet with a destination address being the multicast address is oriented.

In a specific implementation, the port configuration command is recorded in a protocol packet, and the node server further comprises:

a protocol packet orienting module configured to orient the protocol packet to a corresponding access switch by connecting to a downlink port of the corresponding access switch according to settings of a downlink protocol packet address table preset internally;

wherein the downlink protocol packet address table is set with a downlink port to which a protocol packet with a destination address being an address of a subordinate access network device is oriented.

If the node server obtains currently many pieces of communication link information of the current service, then the communication link acquiring module of the node server further comprises:

a communication link selecting submodule configured to select, when obtaining many pieces of communication link information of the current service, one piece of communication link information therefrom as the communication link information of the current service according to a preset rule, Wherein the preset rule can be that the node server acquires flow information of each communication link and flow information of the current service, and determines the information of a communication link with the minimum flow used as the communication link information of the current service; or the preset rule can also be that the node server acquires bandwidth information of each communication link and bandwidth information of the current service, and determines the information of a communication link with the maximum bandwidth as the communication link information of the current service.

Preferably, when the access switch is an access switch connected between the source terminal and the node server, the access switch further comprises:

a protocol packet orienting module configured to orient the service request protocol packet initiated by the source terminal to the node server via an uplink port of the access switch according to settings of its internal preset uplink protocol packet address table;

wherein the uplink protocol packet address table is set with an uplink port to which a protocol packet with a destination address being the address of the node server is oriented.

After the current service is completed, the node server further comprises:

a server port releasing module configured to release the port, to which the data packet of the current service is oriented and which is set in its internal data packet address table, after the current service is completed; and a switch port release configuration module configured to transmit a port release command to the access switch that participates in the current service; and the access switch further comprises:

a port releasing module configured to release the port, to which the data packet of the current service is oriented and which is set in its internal data packet address table, according to the port release command.

Furthermore, after the current service is completed, the node server can further comprises:

a service ending command transmitting module configured to transmit a service ending command to the source terminal and/or the target terminal;

the source terminal further comprises a first service ending module configured to end service processing according to the service ending command; and the target terminal further comprises a second service ending module configured to end service processing according to the service ending command.

In order to manage and control centrally the access network address well, the node server is further set with an address information table therein, wherein address occupation information, device identification information and device resource information are recorded in the address information table.

In this case, after the current service is completed, the node server further comprises:

an address information table modifying module configured to modify contents in the preset address information table, wherein the modifying includes: updating the address occupation information in the corresponding item of the released port as not occupied; and updating the corresponding device identification information and device resource information.

In the embodiment of the invention, the access network device can access the novel network by the following function modules:

the node server comprises: a downlink protocol packet transmitting module configured to transmit a downlink protocol packet to the access switch; and a first network access command transmitting module configured to transmit a network access command according to an uplink protocol packet replied by the access switch; and the access switch further comprises:

a table 0 initialization configuration module configured to set a CPU module, to which all downlink protocol packets are oriented, in its internal downlink protocol packet address table when being powered on;

a downlink protocol packet receiving module configured to orient a received downlink protocol packet to the CPU module of the access switch according to settings of the downlink protocol packet address table, wherein the downlink protocol packet contains an access network address to be allocated;

an uplink protocol packet replying module configured to generate an uplink protocol packet by the CPU module and transmit the uplink protocol packet to the node server;

a first network access command receiving module configured to receive a network access command transmitted from the node server, wherein the network access command contains an access network address of the access switch, and the access network address is the access network address to be allocated in the downlink protocol packet received by the access switch; and a first table 0 setting module configured to update its internal downlink protocol packet address table as that only a protocol packet with a destination address being its own access network address is oriented to the CPU module.

In a specific implementation, the access switch generally further connects to other subordinate access network devices, and in this case, the node server transmits a port allocation packet to the access switch which has accessed the network, that is, as a preferred embodiment of the invention, the node server further comprises: a port allocation packet transmitting module configured to transmit a port allocation packet to the access switch which has accessed the network, wherein the port allocation packet contains port allocation information, and the port allocation information is information of each downlink port of the access switch to which each port downlink protocol packet is oriented; and the access switch further comprises:

a first orienting module configured to orient a port allocation packet with a destination address being its own access network address to the CPU module; and a second table 0 setting module configured to set, in its internal downlink protocol packet address table, a downlink port to which each port downlink protocol packet is oriented according to the port allocation information.

More preferably, the node server further comprises: a port downlink protocol packet transmitting module configured to transmit a port downlink protocol packet to the access switch which has accessed the network, wherein the port downlink protocol packet contains an access network address to be allocated; and the access switch further comprises:

a second orienting module configured to orient the port downlink protocol packet to a corresponding downlink port according to settings of its internal downlink protocol packet address table.

More preferably, the access network device further comprises a subordinate access network device connected to a downlink port of the access switch which has accessed the network; and the node server further comprises a second network access command transmitting module configured to transmit a network access command to the subordinate access network device; and the subordinate access network device comprises:

a port uplink protocol packet replying module configured to generate a port uplink protocol packet for a received port downlink protocol packet and transmit the port uplink protocol packet to the node server; and a second network access command receiving module configured to receive the network access command transmitted from the node server, wherein the network access command contains an access network address of the subordinate access switch, and the access network address is the access network address to be allocated in the port downlink protocol packet received by the subordinate access switch.

An embodiment of the invention further discloses a node server, comprising:

a service request receiving module configured to receive a service request protocol packet initiated by a source terminal;

a communication link acquiring module configured to acquire communication link information of current service according to the service request protocol packet initiated by the source terminal, wherein the communication link information includes communication port information of the access switch which participates in the current service; and a switch port configuration module configured to transmit a port configuration command to the corresponding access switch according to the communication port information of the access switch.

Preferably, the communication link information further includes communication port information of the node server which participates in the current service, and at this time, the node server further comprises an address table configuration module configured to set, in its internal data packet address table, a port to which the data packet of the current service is oriented according to the communication port information of the node server.

In practice, the communication connection method in the embodiment of the invention not only applies to multicast communication but also applies to unicast communication, that is, the service request initiated by the source terminal includes a unicast communication service request and a multicast communication service request, and accordingly, the data packet address table includes a unicast data packet address table and a multicast data packet address table.

In the case of performing the unicast communication service, the communication link acquiring module comprises:

a unicast service protocol packet receiving submodule configured to receive the service request protocol packet initiated by the source terminal for establishing unicast communication service with a target terminal, wherein the service request protocol packet includes service type information, service content information and an access network address of the source terminal, wherein the service content information includes a service number;

a target terminal address acquiring submodule configured to extract an access network address of the target terminal from a preset content-address mapping table according to the service number; and a communication link calculating submodule configured to acquire the communication link information of the current service according to the service type information, the access network address of the source terminal and the access network address of the target terminal.

For the unicast communication service, the communication link information can be unidirectional communication link information, for example, the source terminal initiates a unicast service request to the target terminal or the target terminal initiates a unicast service request to the source terminal; alternatively, the communication link information can be bidirectional communication link information, for example, the source terminal and the target terminal initiate the unicast service request to each other.

In the process of establishing the communication connection, the node server would inform the source terminal and the target terminal, and judge whether the current communication link can be used according to the reply of the target terminal, that is, in a preferred embodiment of the invention, the node server further comprises:

a menu protocol packet transmitting module configured to transmit a menu protocol packet to the source terminal and the target terminal;

a reply protocol packet receiving module configured to receive a reply protocol packet transmitted from the target terminal for the menu protocol packet.

In a specific implementation, the node server further comprises:

a unicast address table determining module configured to determine that the data packet address table set currently is a unicast data packet address table according to the service type information.

Because the node server functions as the main control node on the access network, and a unicast service communication only relates to the downlink port of the node server, the port, to which a unicast data packet of the current service is oriented and which is set by the node server in its internal unicast data packet address table, includes:

a downlink port to which a unicast data packet with a destination address being the source terminal is oriented; and a downlink port to which a unicast data packet with a destination address being the target terminal is oriented.

In a specific implementation, when transmitting the port configuration command to the access switch, the node server can further transmit a service processing command, such as a encoding and decoding command, to the source terminal and the target terminal respectively, that is, preferably, the node server further comprises:

a service processing command transmitting module configured to transmit a service processing command to the source terminal and the target terminal respectively.

In the case of performing the multicast communication service, the communication link acquiring module comprises:

a multicast communication request receiving submodule configured to receive a service request protocol packet initiated by the target terminal for requesting multicast communication service, wherein the service request protocol packet includes service type information, service content information and an access network address of the target terminal, wherein the service content information includes a service number;

a source terminal address extracting submodule configured to extract an access network address of the source terminal from a preset content-address mapping table according to the service number;

a first multicast address allocating submodule configured to acquire a multicast address corresponding to the source terminal, and allocate the multicast address to the target terminal; and a multicast request link calculating submodule configured to acquire the communication link information of the current multicast service according to the service type information, the access network address of the source terminal and the access network address of the target terminal.

In practice, the multicast data packet can be transmitted from the source terminal, and in this case, the communication link acquiring module further comprises:

a multicast communication initiation request receiving submodule configured to receive a service request protocol packet submitted by the source terminal for initiating multicast communication service, wherein the service request protocol packet includes service type information, service content information and an access network address of the source terminal, wherein the service content information includes a service number;

a second multicast address allocating submodule configured to allocate a multicast address to the source terminal according to the service request protocol packet; and an uplink calculating submodule configured to acquire uplink communication link information of the current multicast service according to the service type information and the access network addresses of the node server and the source terminal.

There may be a kind of multicast service that the source terminal also receives the multicast data packet when transmitting the multicast data packet, and in this case, the communication link acquiring module further comprises:

a downlink calculating submodule configured to acquire downlink communication link information of the current multicast service according to the service type information and the access network addresses of the node server and the source terminal.

In practice, the node server further comprises:

a multicast address table determining module configured to determine that the data packet address table set currently is a multicast data packet address table according to the service type information.

Because the node server functions as the main control node on the access network, and a multicast service communication only relates to the downlink port of the node server, the port, to which a multicast data packet of the current service is oriented and which is set by the node server in its internal multicast data packet address table, includes:

a downlink port to which a multicast data packet with a destination address being the multicast address is oriented.

In a specific implementation, the port configuration command is recorded in a protocol packet, and the node server further comprises:

a protocol packet orienting module configured to orient the protocol packet to a corresponding access switch by connecting to a downlink port of the corresponding access switch according to settings of a downlink protocol packet address table preset internally;

wherein the downlink protocol packet address table is set with a downlink port to which a protocol packet with a destination address being an address of a subordinate access network device is oriented.

In a specific implementation, when transmitting the port configuration command to the access switch, the node server can further transmit a service processing command to the target terminal and the target terminal performs a corresponding operation according to the service processing command; or the node server can further transmit a service processing command to the source terminal and the source terminal performs a corresponding operation according to the service processing command. That is, preferably, the node server further comprises:

a first service processing command transmitting module configured to transmit a service processing command to the target terminal; and/or a second service processing command transmitting module configured to transmit a service processing command to the source terminal.

If the node server obtains currently many pieces of communication link information of the current service, then the communication link acquiring module of the node server further comprises:

a communication link selecting submodule configured to select, when obtaining many pieces of communication link information of the current service, one piece of communication link information therefrom as the communication link information of the current service according to a preset rule.

As a preferred embodiment of the invention, the preset rule can be that the node server acquires flow information of each communication link and flow information of the current service, and determines the information of a communication link with the minimum flow used as the communication link information of the current service; or the preset rule can also be that the node server acquires bandwidth information of each communication link and bandwidth information of the current service, and determines the information of a communication link with the maximum bandwidth as the communication link information of the current service.

After the current service is completed, the node server further comprises:

a server port releasing module configured to release the port, to which the data packet of the current service is oriented and which is set in its internal data packet address table, after the current service is completed; and a switch port release configuration module configured to transmit a port release command to the access switch that participates in the current service.

Preferably, the node server can further comprises:

a service ending command transmitting module configured to transmit a service ending command to the source terminal and/or the target terminal.

In order to manage and control centrally the access network address well, the node server is further set with an address information table therein, wherein address occupation information, device identification information and device resource information are recorded in the address information table.

In this case, after the current service is completed, the node server further comprises: an address information table modifying module configured to modify contents in the preset address information table, wherein the modifying includes: updating the address occupation information in the corresponding item of the released port as not occupied; and updating the corresponding device identification information and device resource information.

An embodiment of the invention further discloses a access switch, comprising:

a port configuration command receiving module configured to receive a port configuration command transmitted from a node server, wherein the port configuration command contains communication port information of the access switch which participates in current service in communication link information of the current service, wherein the communication link information is generated according to a service request protocol packet initiated by a source terminal; and an address table configuration module configured to set, in its internal data packet address table, a port to which a data packet of the current service is oriented, according to the port configuration command.

Preferably, the service request initiated by the source terminal includes a unicast communication service request and a multicast communication service request; and accordingly, the data packet address table includes a unicast data packet address table and a multicast data packet address table.

In the process of establishing the communication connection, the node server would inform the source terminal and the target terminal, and judge whether the current communication link can be used according to the reply of the target terminal, that is, in a preferred embodiment of the invention, the access switch comprises a first access switch located between the node server and the source terminal, and a second access switch located between the node server and the target terminal;

the first access switch further comprises:

a first menu protocol packet orienting module configured to orient the menu protocol packet to the source terminal according to settings of its internal preset protocol packet address table;

the second access switch further comprises:

a second menu protocol packet orienting module configured to orient the menu protocol packet to the target terminal according to settings of its internal preset protocol packet address table;

wherein the protocol packet address table is set with a CPU module, to which a protocol packet with a destination address being an access network address of the current access switch is oriented, and a port, to which a protocol packet with a destination address being an address of another access network device is oriented.

That is, the node server can transmit the menu protocol packet to the source terminal and the target terminal based on settings of the preset protocol packet address table.

The node server informs the access switch of configuring the table in the two following ways:

1) when the communication link information is unidirectional communication link information, the communication port information of the access switch includes uplink port information of the access switch in an uplink and downlink port information of the access switch in a downlink;

the port, to which the unicast data packet of the current service is oriented and which is set by the access switch in its internal unicast data packet address table according to the port configuration command, includes:

an uplink port of the access switch in the uplink and a downlink port of the access switch in the downlink to which a unicast data packet with a destination address being the target terminal is oriented.

2) when the communication link information is bidirectional communication link information, the communication port information of the access switch includes uplink port and downlink port information of the access switch in an uplink and uplink port and downlink port information of the access switch in a downlink;

the port, to which the unicast data packet of the current service is oriented and which is set by the access switch in its internal unicast data packet address table according to the port configuration command, includes:

an uplink port and a downlink port of the access switch in the uplink to which a unicast data packet with a destination address being the target terminal is oriented; and an uplink port and a downlink port of the access switch in the downlink to which a unicast data packet with a destination address being the source terminal is oriented.

In the case of performing the multicast communication service, the communication port information of the access switch includes uplink port information of the access switch in an uplink and downlink port information of the access switch in a downlink;

the port, to which a multicast data packet of the current service is oriented and which is set by the access switch in its internal multicast data packet address table according to the port configuration command, includes:

an uplink port of the access switch in the uplink and a downlink port of the access switch in the downlink to which a multicast data packet with a destination address being the multicast address is oriented.

In practice, the multicast data packet can be transmitted from the source terminal, and in this case, the communication port information of the access switch further includes downlink port information of the access switch in an uplink;

the port, to which a multicast data packet of the current service is oriented and which is set by the access switch in its internal multicast data packet address table according to the port configuration command, further includes:

a downlink port of the access switch in the uplink to which a multicast data packet with a destination address being the multicast address is oriented.

There may be a kind of multicast service that the source terminal also receives the multicast data packet when transmitting the multicast data packet, and in this case, the access switch is an access switch connected between the source terminal and the node server, and the access switch further comprises:

a protocol packet orienting module configured to orient the service request protocol packet initiated by the source terminal to the node server via an uplink port of the access switch according to settings of its internal preset uplink protocol packet address table;

wherein the uplink protocol packet address table is set with an uplink port to which a protocol packet with a destination address being the address of the node server is oriented.

After the current service is completed, the access switch further comprises:

a port releasing module configured to release the port, to which the data packet of the current service is oriented and which is set in its internal data packet address table, according to a port release command transmitted from the node server.

It should be noted that, as divided according to actual hardware, the node server of the invention mainly comprises a network interface module, a switching engine module, a CPU module and a disk array module; the access switch of the invention mainly comprises a network interface module (a downlink network interface module and an uplink network interface module), a switching engine module and a CPU module; because the above hardware modules perform different functions for different processing situations, for example, the switching engine module looks up in different address tables for different packets (protocol packets and data packets, etc.), and thus the orientation information of the packets obtained will be different; or in the case that the CPU module receives a packet, it may configure an address table, or it may parse the packet and generate a reply packet. Thus, for those skilled in the art to better understand the invention, in the embodiments of the invention, the modules related to the node server, the access switch and the network access system of the access network device of the invention are mainly described with regard to their functions. However, essentially, such functional modules correspond to the actual hardware modules.

In comparison with the prior art, the invention has the following advantages:

In the invention, when a service request is initiated by a main control server (in the protocol interaction process established by the communication process), the transmission path of the current service data is set in advance in the table configuration mode of each access switch according to situation of the service request, and during the transmission process of the data packet, the data packet may be transmitted just according to the transmission path, without the need to employ the solution of the existing IP protocol, and each data packet negotiates the transmission route autonomously. In a word, the present invention may guarantee the stability and smoothness of the transmission path and avoid multimedia service delays.

Secondly, in the invention, a mode of table configuration is employed for all data services (especially unicast data packets), and a path is set in advance, thus the state information security requirements may be met. For example, for state information security, it requires monitoring certain data in the novel network; by employing the mode of table configuration according to the invention, it is very easy to orient the data transmitted by the current service to a monitoring channel, so that it can meet state information security requirements.

Furthermore, in the invention, the access switch does not need to perform route calculation for each data packet, and it does not need to maintain the network device topology around it, either, so long as oriented transmission is performed according to the data packet address table configured in advance, and the orienting process may be implemented via hardware, which may greatly improve the orienting efficiency of the switch, drastically lower the operation demand of the switch, and save hardware resources.

DETAILED DESCRIPTION OF THE EMBODIMENTS

Figure 1:
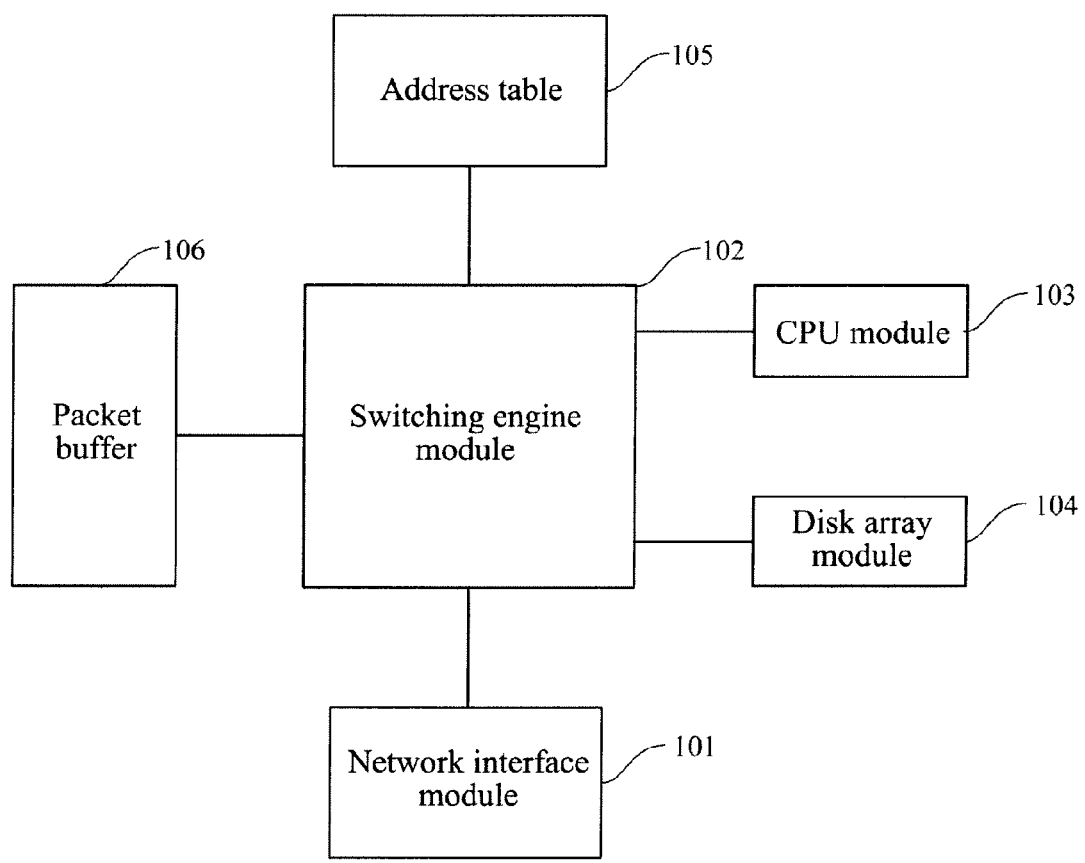
FIG. 1 shows the hardware structural representation of a node server according to the invention.

To make the above objects, characteristics and advantages of the invention more apparent, the invention will be further illustrated below in detail in conjunction with the drawings and embodiments.

1) The core concept of the invention will be briefly introduced below.

It is considered by the inventor that the present invention has the following several sufficient conditions for realizing network-wide QoS:

Firstly, the mechanism about "Best Efforts" in the core theories of IP Internet will certainly cause network flow non-uniformity and frequent packet loss. In fact, TCP protocol just utilizes the packet loss state of the network to adjust the transmission flow.

Secondly, the mechanism about "Store & Forward" in the core theories of IP Internet will cause a greater non-uniformity of network flow at the next node at the time it absorbs the local burst flow.

Thirdly, the mechanism about "Error Detection & Retransmission" in the core theories of IP Internet will cause an intolerable delay in synchronous video communication, thus it has no use value.

Fourthly, successional network flow non-uniformity or burst flow will certainly cause periodic switch (router) packet loss.

Thus it can be seen that, because the computer file burst flow is discrete in essence and has no subsequent burst flows, the above core theories of IP Internet have once made the Internet able to transmit a file efficiently. However, when facing the QoS in successional synchronous streaming media transmission, the above core theories of IP Internet becomes a prime criminal that harms the quality of network transmission. A conclusion has been drawn from the above discussion that, none of resource reservation, priority and light-load solutions can solve the QoS of synchronous streaming media fundamentally.

Since none of the above methods is feasible, how can we guarantee the quality of network transmission?

It is considered by the inventor that the current various QoS methods are all based on an error hypothesis. According to this hypothesis, the QoS solution is to provide a privilege of being processed preferentially to video flow. But in fact, because the network flow needed by different media forms is extremely non-uniform, video flow will be the absolute main body on the network so long as a few users use a video service.

Seen from another viewpoint, providing a good quality especially to a majority of the network flows is equivalent to providing a poor quality especially to a minority of the non-video flows. Since a majority of the network flows must require QoS, why not provide QoS to the remaining minority of service flows that does not require QoS? It is hypothesized that, when subscribing a airline ticket, 1000 passengers request first class and only a few passengers accept economy class, then a natural measure taken by the airline company is to cancel economy class, because the cost taken by the airline company to provide only a few economy-class services is much greater than that to provide free class upgrade for these passengers. In fact, it is very easy to guarantee the quality of all network transmission or none of the network transmission, but it is difficult to partially guarantee the quality, especially when we do not know the dividing line of the two parts. Therefore, no QoS problem will exist, so long as QoS is provided to all network services.

In its early stage, IP Internet is just like a country road, and no traffic policeman is needed in a small town with unsophisticated folkway. However, in a bustling bigalopolis, the disordered scene on some busy roads is out of control even with traffic lights and traffic policemen, and it is difficult to be on time for trips or appointments, just like today's IP Internet.

The invention is just like a highway, with no policeman or traffic light; and motor vehicles are restricted to run on specified roads via traffic lanes isolated by concrete and flyover crossings. According to the experience of the traffic bureau of California, the way to avoid highway jam is to close the entrance ramp.

The design concept of California highway has three features:
  a switch is set on the entrance ramp of the highway for controlling the macroscopic traffic flow;
  the driving speed is kept stable, thereby improving the traffic rate; and
  road isolations of a concrete structure and flyover crossings, rather than policemen and traffic lights, are employed to restrict vehicle driving.

The embodiments of the invention conform to theory of telephone networks and take three measures similar to those of the above highway:
  the flow on each path is calculated and measured, once the flow is to be saturated, it will be bypassed, or new users will be rejected;
  strict uniform-flow transmission is performed, and in the embodiments of the invention, a packet loss rate of 1/1,000,000 can be attained in TV under a heavy-load flow of 90%; and
  uplink data matching and flow control are performed, so that it can be ensured on structure that users strictly conform to the traffic rules, because it is impossible to expect that all users autonomously take the QoS measures.

Computer files and streaming media are two kinds of distinct media forms, and the processing modes thereof are exclusive to each other. Theory and practice of the network according to the invention disclose the following two achievements:
  a price-performance ratio that is a hundredfold of that of IP Internet;
  a method for developing high-quality symmetrical TV without interfering with the existing IP Internet service.

Especially on a large-flow backbone network, computer files and streaming media use the same optical fiber via different wavelengths. If they must be united to a single network, for example, an access network, then the computer files should be united to a video streaming network. An embodiment of the invention provides a complete solution for transparent bearer IP Internet.

Separating streaming media and files is just the first step, it is more important to guarantee the quality of the independent streaming media network.

As described above, the PSTN telephone network employs a strict synchronization mechanism, and the network congestion phenomenon will not appear before the flow is occupied 100 percent. Theoretically, a uniform flow will be obtained after a plurality of uniform flows are combined. It has been further proved by practice that under the premise of a uniform flow, the network flow may reach its limit value, with no packet loss phenomenon appears. Because the video media flow, which occupies over ninety percent of the further network flow, has the characteristics of a uniform flow, in the present that takes video service as the main object, the approach to guaranteeing Internet QoS is of course to eliminate source flow non-uniformity, especially to fundamentally prevent packet loss phenomenon of a network switch from appearing under a heavy load condition.

In an embodiment of the invention, a modified Ethernet is employed to establish a correction-oriented circuit, and packets with fixed length are unitedly employed network-wide. A media flow of any bandwidth may be obtained by only changing the time interval of packet transmission. To guarantee the uniform-flow characteristic of the network, it is required by the Internet of the invention that terminal designing must have a uniform-flow ability. However, in the practical network environment, it cannot expect that all the users autonomously comply with the uniform-flow specification. Therefore, in an embodiment of the invention, the node server issues a passport to the network switches, which only allows a user packet to pass uniformly under a very fine time precision. To a user terminal that is designed according to the specified requirements, the passport is totally transparent.

Under the above premise, a satisfactory result is obtained in network practice. The switch of the invention can obtain a heavy load packet loss rate less than 1/1,000,000 in the condition of a bandwidth utilization of 90%.

In conclusion, QoS is an unavoidable problem of the next generation network, and streaming media network is another species that is different from the traditional computer files.

Therefore, it has no future to adapt the IP Internet to video services, and the only way out is to create a new network.

2) A novel network put forward in the invention will be introduced below.

The novel network has a network structure that is controlled centralizedly. It may be the types of tree network, star network and ring network, etc.; but on this basis, a centralized control node is needed on the network to control the whole network.

The novel network is divided into two parts: an access network and a metropolitan area network. Devices on the access network part mainly may be mainly divided into 3 categories: a node server, an access switch and a terminal (including various set-top boxes, code plates and storages, etc.). Wherein, a node server is a node on the access network that has a centralized control function, and it can control the access switch and the terminal. The node server may be directly connected with the access switch, and it may be directly connected with the terminal. Similarly, devices on the metropolitan area network part may be divided into 3 categories: a metropolitan area server, a node switch and a node server. Wherein, the node server is just the node server on the access network part, that is, the node server not only belongs to the access network part, but also belongs to the metropolitan area network part. The metropolitan area server is a node on the metropolitan area network that has a centralized control function, and it may control the node switch and the node server. The metropolitan area server may be directly connected with the node switch, or it may be directly connected with the node server. Thus it can be seen that the whole novel network has a network structure that is controlled centralizedly by layers, while the networks controlled under the node server and the metropolitan area server may have various structures, for example, tree type, star type and ring type, etc.

1. The Classification of the Novel Network Device 1.1 Device in the novel network system of the invention may be mainly divided into 3 categories: a server, a switch (including an Ethernet gateway) and a terminal (including various set-top boxes, code plates and storages, etc.). Generally, the novel network may be divided into a metropolitan area network (or state network and global network, etc.) and an access network.

1.2 Devices on the access network part may be mainly divided into 3 categories: a node server, an access switch (including an Ethernet gateway) and a terminal (including various set-top boxes, code plates and storages, etc.).

The specific hardware structure of each access network device is as follows:

Node Server:

As shown in FIG. 1, a node server mainly includes a network interface module 101, a switching engine module 102, a CPU module 103 and a disk array module 104;

Wherein, packets coming from the network interface module 101, the CPU module 103 and the disk array module 104 all enter the switching engine module 102; the switching engine module 102 performs an operation of checking the address table 105 on the packets, so that the orientation information of the packets is obtained; the packets are stored in a queue of the corresponding packet buffer 106 according to the orientation information of the packets; if the queue of the packet buffer 106 is to be full, the packets are discarded; the switching engine module 102 polls all the packet buffer queues, and forwards the queue if the following conditions are met: 1) the port sending buffer is not full; 2) the count of the packet counter in the queue is greater than 0. The disk array module 104 mainly realize the control on a hard disk, including operations of initialization, read and write, etc. on the hard disk; the CPU module 103 is mainly responsible for the protocol processing with the access switch and the terminal (not shown), the configuring of the address table 105 (including downlink protocol packet address table, uplink protocol packet address table and packet address table), and the configuring of the disk array module 104.

Figure 2:
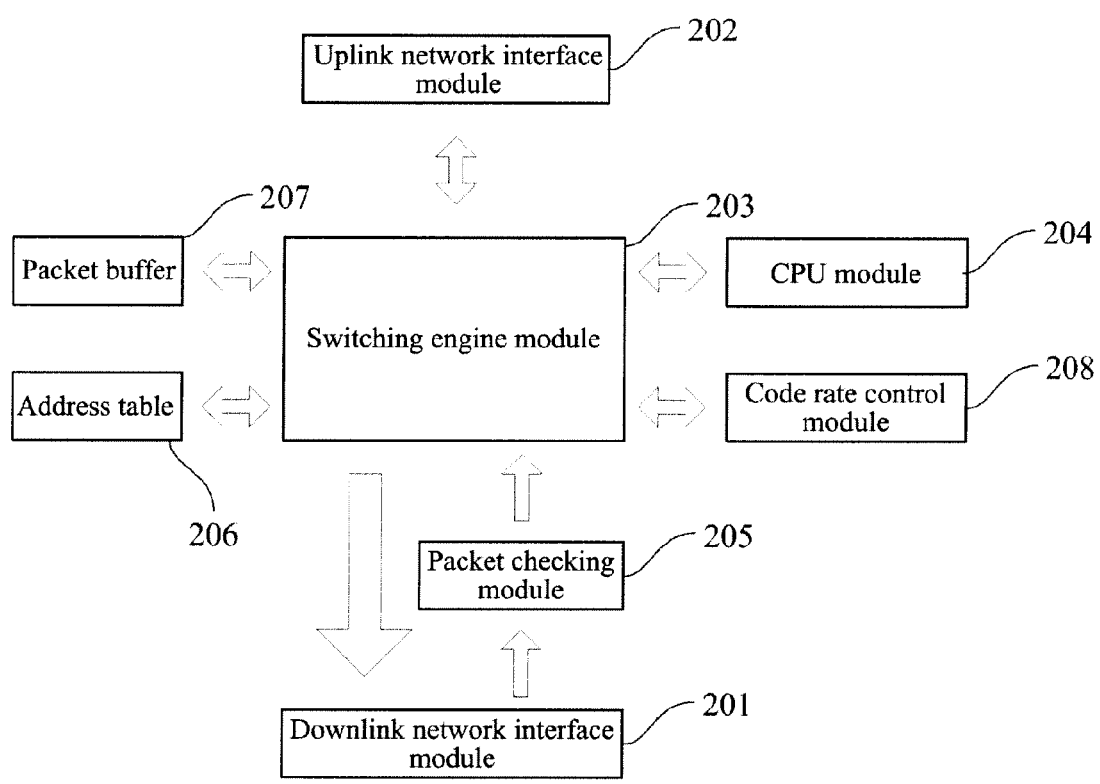
FIG. 2 shows the hardware structural representation of an access switch according to the invention.

Access Switch:

As shown in FIG. 2, the access switch mainly includes a network interface module (downlink network interface module 201 and uplink network interface module 202), a switching engine module 203 and a CPU module 204;

Wherein, packets coming from the downlink network interface module 201 (uplink data) enters the packet checking module 205; the packet checking module 205 checks whether the destination address (DA), source address (SA), packet type and packet length of the packets meet a requirement, if yes, it allocates a corresponding stream identifier (stream-id), and puts it into the switching engine module 203; otherwise, the packets are discarded. The packets coming from the uplink network interface module 202 (downlink data) enter the switching engine module 203; the packets coming from the CPU module 204 enter the switching engine module 203; the switching engine module 203 performs an operate of checking the address table 206 on the packets, so that the orientation information of the packets is obtained; if the packets entering the switching engine module 203 go from a downlink network interface to an uplink network interface, the packets are stored in a queue of the corresponding packet buffer 207 in conjunction with the stream identifier (stream-id); if the queue of the packet buffer 207 is to be full, the packets are discarded; if the packets entering the switching engine module 203 do not go from a downlink network interface to an uplink network interface, the packets are stored in a queue of the corresponding packet buffer 207 according to the orientation information of the packets; if the queue of the packet buffer 207 is to be full, the packets are discarded.

The switching engine module 203 polls all the packet buffer queues, and it is divided into two cases in the embodiments of the invention:

if the queue goes from a downlink network interface to an uplink network interface, it will be forwarded when the following conditions are met: 1) the port sending buffer is not full; 2) the count of the packet counter in the queue is greater than 0; and 3) a token generated by a code rate control module is obtained;

if the queue does not go from a downlink network interface to an uplink network interface, it will be forwarded when the following conditions are met: 1) the port sending buffer is not full; 2) the count of the packet counter in the queue is greater than 0.

The code rate control module 208 is configured by the CPU module 204, and a token is generated for all packet buffer queues that go from a downlink network interface to an uplink network interface in a programmable interval, for controlling the code rate of uplink forwarding.

The CPU module 204 is mainly responsible for the protocol processing with the node server, the configuring of the address table 206 and the configuring of the code rate control module 208.

Terminal:

The terminal mainly comprises a network interface module, a service processing module and a CPU module; for example, a set-top box mainly comprises a network interface module, a video and audio coding/decoding engine module and a CPU module; a code plate mainly comprises a network interface module, a video and audio coding engine module and a CPU module; and a storage mainly comprises a network interface module, a CPU module and a disk array module.

1.3 The device on the metropolitan area network part may be mainly divided into 2 categories: a node server, a node switch and a metropolitan area server. Wherein, the node switch mainly includes a network interface module, a switching engine module and a CPU module; the metropolitan area server mainly comprises a network interface module, a switching engine module and a CPU module.

2. The Definition of Novel Network Data Packet 2.1 The Definition of Access Network Data Packet The access network data packet mainly includes the following parts: destination address (DA), source address (SA), reserved byte, payload (PDU) and CRC.

As shown by the table below, the access network data packet mainly includes the following parts:

| DA | SA | Reserved | Payload | CRC |
|----|----|----------|---------|-----|

Wherein:

Destination address (DA) is consisted of 8 bytes, wherein the first byte represents packet type (for example, protocol packet, multicast data packet and unicast data packet, etc.), and there are 256 possibilities at most; the second byte to the sixth byte represent metropolitan area network address; the seventh byte and the eighth byte represent access network address;

Source address (SA) is also consisted of 8 bytes, the definition of which is the same as that of destination address (DA);

Reserved byte is consisted of 2 bytes;

The payload part has different lengths according to different types of datagrams, if it is a protocol packet, it has a length of 64 bytes; if it is a unicast or multicast data packet, it has a length of 32+1024=1056 bytes; however, it is not limited to the above two cases;

CRC is consisted of 4 bytes, and the calculation method thereof conforms to standard Ethernet CRC algorithm.

2.2 The Definition of Metropolitan Area Network Data Packet

The topology of a metropolitan area network is a pattern type, and there are two or even more than two connections between two devices; that is, there may be more than two connection between a node switch and a node server, between a node switch and a node switch and between a node switch and a node server. However, the metropolitan area network address of a metropolitan area network device is unique. In order to accurately describe the connection relation between metropolitan area network devices, the following parameter is introduced in the embodiments of the invention: label, for uniquely describe a metropolitan area network device.

The definition of the label in this specification is similar to that of the label in Multi-Protocol Label Switch (MPLS). It is hypothesized that two connections exist between device A and device B, then a data packet will have two labels from device A to device B, and a data packet will have two labels from device B to device A, too. The label is divided into IN label and OUT label. It is hypothesized that the label of a data packet when it enters device A (IN label) is 0x0000, then the label of the data packet when it leaves device A (OUT label) will become 0x0001. The network access process on the metropolitan area network is a network access process that is controlled centralizedly, which means that the address allocation and label allocation of the metropolitan area network are both dominated by the metropolitan area server, and the node switch and the node server only execute passively. This is different from the label allocation in MPLS, wherein the label allocation in MPLS is a mutual negotiation result of the switch and the server.

As shown by the table below, a data packet on the metropolitan area network mainly includes the following parts:

| DA | SA | Reserved | Label | Payload | CRC |
|----|----|----------|-------|---------|-----|

That is, destination address (DA), source address (SA), reserved byte (Reserved), label, payload (PDU) and CRC. Wherein, for the format of label, reference may be made to the following definition: Label is consisted of 32 bits, wherein the high 16 bits are reserved, and only the low 16 bits are used; Label lies between reserved byte and payload of a data packet.

3. The Implementation of the Novel Network

The network access process of a node server and an access switch and the network access process of a node server and a terminal will be discussed below. In order to simplify the design, four types of data packets are defined on the access network, respectively:

downlink protocol packet (a protocol packet sent from a node server to an access switch or a terminal);

uplink protocol packet (a protocol packet replied by an access switch or a terminal to a node server);

unicast data packet; and multicast data packet;

A access network address is consisted of 16 bits, so the total number of access switches and terminals that can be accessed will be 65536. It is hypothesized that the datagram type of the downlink protocol packet is "1000 0000" (binary system), i.e., 0x80 (hexadecimal system), then the datagram type of the uplink protocol packet will be "0000 1000" (binary system), i.e., 0x08 (hexadecimal system), the datagram type of the unicast data packet will be "0001 0000" (binary system), i.e., 0x10 (hexadecimal system), the datagram type of the multicast data packet will be "0111 1000" (binary system), i.e., 0x78 (hexadecimal system); by combining like terms, an address table with a length of 8 bits may be mapped to an address table with a length of 2 bits, for example:

"1000 0000"=>"00", the address table of a downlink protocol packet, which is defined in the embodiments of the invention as table 0;

"0000 1000"=>"01", the address table of an uplink protocol packet, which is defined as table 1 in the embodiments of the invention;

"0001 0000"=>"10", the address table of a unicast data packet, which is defined as table 2 in the embodiments of the invention;

"0111 1000"=>"11", the address table of a multicast data packet, which is defined as table 3 in the embodiments of the invention.

In conjunction with the 16-bit access network address, in practice, it only needs four address tables of 64K=4×65536, that is, 256K. The output of the address table represents the port to which a data packet is to be oriented. For example, access switch BX-008 has 1 uplink 100M network interface, 8 downlink 100M network interfaces and 1 CPU module interface. If the 8 downlink 100M network interfaces are in turn defined as port 0 to port 7, the CPU module interface is defined as port 8, and the uplink 100M network interface is defined as port 9, then an address table of totally 256K×10 bit will be needed, for example, the output "00 0000 0001" of the address table represents port 0 to which a data packet is to be oriented, "11 0000 0000" represents port 8 and port 9 to which a data packet is to be oriented, and so on.

It is hypothesized that a data packet coming from port 9 has a destination address (DA) of 0x8056 0x15000x00000x55aa, then its packet type will be 0x80, and its access network address will be 0x55aa; according to a table lookup rule, table 0 will be looked up, that is, the address is "00 0101 0101 1010 1010", and the output of the address table corresponding to this address will be "01 0000 0000", which represents that the data packet is to be oriented to port 8.

3.1 Communication Connection Process of an Access Network Device 3.1.1 An example of the communication connection process in which an access network device performs a unicast communication service.

Figure 3:
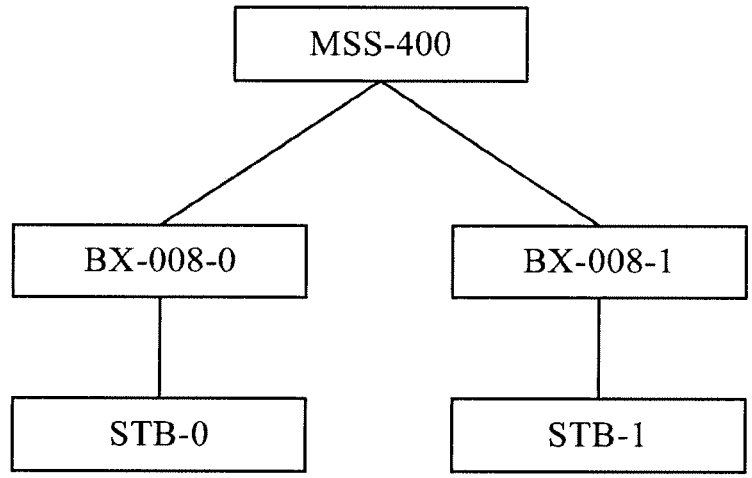
FIG. 3 is a schematic diagram showing the connection among a node server, an access switch and a terminal according to the invention.

As shown in FIG. 3, it is hypothesized that there exists a node server MSS-400 (with an access network address of 0x0000), port 0 thereof is connected with an access switch BX-008-0 (with an access network address of 0x0001), port 1 thereof is connected with an access switch BX-008-1 (with an access network address of 0x0002), and port 0 of BX-008-0 is connected with a set-top box STB-0 (with an access network address of 0x0009), port 1 of BX_008-1 is connected with a set-top box STB-1 (with an access network address of 0x0012). Set-top box STB_0 issues a request to node server MSS-400 for performing a unicast communication service of visual communication with set-top box STB_1, in the following steps:

S1) Set-Top box STB_0 issues a service request protocol packet, the DA (destination address) of the packet is 0x08000x00000x0000 0x0000 (i.e., the address of MSS-400), and the SA (source address) is 0x00000x00000x0000 0x0009; the packet may further comprise reserved 0x0000 (reserved word), and the PDU part is as shown in the following table:

| | | | 8e01 |
|---|---|---|---|
| Field Number | Length | Code | Description |
| 0 | 1W | 8e01 | user request instruction (source terminal →node server) |
| 1 | 1W | | service type (service_type) |
| 2-4 | 3W | | user number (source terminal number) |
| 5 | 1W | | user extension number (source terminal extension number) |
| 6-31 | 26W | | service parameter (0 is added to an unoccupied part) |

The program number and the broadcast channel number related to the service request are both put in the service parameter, for example:

define SERVICE_TYPE_GTML_REQUEST 0x8000, requesting for a menu define SERVICE_TYPE_VOD_REQUEST 0x8001, requesting for a VOD program define SERVICE_TYPE_CHANGE_MENU 0x8002, requesting for changing background menu define SERVICE_TYPE_BROADCAST_REQUEST 0x8003, requesting for watching broadcast define SERVICE_TYPE_CHANGE_CHANNEL 0x8004, requesting for changing channel define SERVICE_TYPE_TELEPHONE_DIRECT 0x8005, requesting for sending a videophone define SERVICE_TYPE_PERMISSION 0x8006, an reply of whether access is permitted define SERVICE_TYPE_RECORD_REQUEST 0x8007, requesting for recording define SERVICE_TYPE_END_REQUEST 0x8008, requesting for ending the current service define SERVICE_TYPE_ORG_CAST_REQUEST 0x8009, requesting for originating a living broadcast define SERVICE_TYPE_DDB_REQUEST 0x800b, requesting for watching delayed TV define SERVICE_TYPE_SKIP 0x800c, fast forward, fast rewind, pause and continue during the processing of watch a VOD or delayed TV define SERVICE_TYPE_RECORD_END 0x800e, requesting for ending recording define SERVICE_TYPE_VIEW_Monitor_DIRECT 0x8024, requesting for watching monitor define SERVICE_TYPE_RCV_CAST_DIRECT 0x8025, requesting for watching living broadcast define SERVICE_TYPE_TELEPHONE_REQUEST 0, requesting for sending a videophone define SERVICE_TYPE_RCV_CAST_REQUEST Oxa, requesting for watching living broadcast define SERVICE_TYPE_VIEW_Monitor 0xc, requesting for watching monitor

In this example, the service parameter is SERVICE_TYPE_TELEPHONE_REQUEST or SERVICE_TYPE_TELEPHONE_DIRECT.

S2) According to the configuration of table 1 on access switch BX-008-0 connected between set-top box STB_0 and node server MSS-400, the service request protocol packet is oriented to node server MSS-400, and node server MSS-400 determines that a request for visual communication (service type) is received according to the content of the packet, knows that the called terminal (target terminal) is STB_1 by looking up in a CAM table (content-address mapping table) according to the service number, knows the link topology related to the current service according to its internal address information table, and determines that the link is permitted and communication may be established between the two parts. Then, a menu protocol packet is sent respectively to the calling party (STB_0) and the called party (STB_1), and it waits the called party to reply;

Wherein, menu protocol packet sent to STB_0: DA is 0x80000x00000x0000 0x0009, SA is 0x00000x00000x00000x0000, reserved is 0x0000, and PDU part is as shown in the following table:

| Field Number | Length | Code | Description |
|---|---|---|---|
| 0 | 1W | 3900 | data download instruction |
| 1 | 1W | | data type (0 = null, 1 = gtml 2 = gtmlfodder 3 = set-top box program 4 = start menu 5 = bmp 100 = dsp program on gateway 101 = dsp program of 008) |
| 2 | 1W | | reserved |
| 3 | 1W | | number of valid packets |
| 4 | 1W | | sequence number of the current packet |
| 5 | 1W | | length of valid data in the current packet |
| 6-14 | 9W | | reserved |
| 15-526 | 512W | | data |
| 527 | 1W | | CRC (summarization of 512 data) | menu protocol packet sent to STB_1: DA is 0x80000x00000x0000 0x0012, SA is 0x00000x00000x00000x0000, reserved is 0x0000, and PDU part is as shown in the above table.

S3) According to the configuration of table 0 on node server MSS-400 and the configuration of table 0 on access switches BX-008-0 and BX-008-1, these 2 menu protocol packets will be respectively oriented to set-top boxes STB_0 and STB_1, the called STB_1 issues a request SERVICE_TYPE_PERMISSION for accepting the communication from STB_1 and sends a reply protocol packet to node server MSS-400, wherein DA the reply protocol packet is 0x0800 0x00000x00000x0000, SA is 0x00000x00000x0000 0x0012, reserved is 0x0000, service parameter is SERVICE_TYPE_PERMISSION, and PDU part is as shown in the following table:

| | | | 8e01 |
|---|---|---|---|
| Field Number | Length | Code | Description |
| 0 | 1W | 8e01 | user request instruction (target terminal →node server) |
| 1 | 1W | | service type (service_type) |
| 2-4 | 3W | | user number (source terminal number) |
| 5 | 1W | | user extension number (source terminal extension number) |
| 6-31 | 26W | | service parameter (SERVICE_TYPE_PERMISSION) |

S4) According to the configuration of table 1 on access switch BX-008-1, the reply protocol packet is oriented to node server MSS-400, and node server MSS-400 determines that a request for accepting visual communication is received according to the content of the packet, knows that the called party is STB_1 by looking up in a CAM table according to the service number, and node server MSS-400 knows the link topology related to the current service according to its internal address information table, and determines that the link is permitted and communication may be established between the two parts.

In such a case, node server MSS-400 configures its own table 2 as follows:
- "10 0000 0000 0001 0010"=>"000 0000 0010", i.e., a unicast data packet with a destination address (DA) of 0x10000x00000x0000 0x0012 (i.e., set-top box BX-008-1) is oriented to port 1;
- "10 0000 0000 0000 1001"=>"000 0000 0001", i.e., a unicast data packet with a destination address (DA) of 0x10000x00000x0000 0x0009 (i.e., set-top box BX-008-0) is oriented to port 0;

Moreover, node server MSS-400 sends a port configuration command to all access switches on the uplink (the calling path) and the downlink (the called path), for requesting to open the uplink of the address of the opposite party and the downlink of the address of its own simultaneously.

The two packets sent to access switch BX-008-0:

1) the first packet: DA is 0x80000x00000x00000x0001, SA is 0x00000x00000x0000 0x0000, reserved is 0x0000, and PDU part is as shown in the following table:

| | | | 8b54 |
|---|---|---|---|
| Field Number | Length | Code | Description |
| 0 | 1W | 8b54 | port configuration command of access switch (node server →access switch) |
| 1 | 1W | | device type (BX-008) |
| 2-5 | 4W | | address of port to be opened: 0x1000 0x0000 0x0000 0x0012 |
| 6 | 1W | | operation mode: "10 0000 0000", which represents that uplink port 9 is opened |
| 7-10 | 4W | | 0000 |
| 11 | 1W | | data type 0x10 |
| 12 | 1W | | access switch address (access network address) 0x0001 |
| 13-15 | 3W | | device flag of access switch |
| 16-31 | 18W | | 0000 |

2) the second packet: DA is 0x80000x00000x00000x0001, SA is 0x00000x0000 0x00000x0000, reserved is 0x0000, and PDU part is as shown in the following table:

| | | | 8b54 |
|---|---|---|---|
| Field Number | Length | Code | Description |
| 0 | 1W | 8b54 | port configuration command of access switch (node server →access switch) |
| 1 | 1W | | device type (BX-008) |
| 2-5 | 4W | | address of port to be opened: 0x1000 0x0000 0x0000 0x0009 |
| 6 | 1W | | operation mode: "00 0000 0001", which represents that port 0 is opened |
| 7-10 | 4W | | 0000 |
| 11 | 1W | | data type 0x10 |
| 12 | 1W | | access switch address (access network address) 0x0001 |
| 13-15 | 3W | | device flag of access switch |
| 16-31 | 18W | | 0000 |

Two packets sent to access switch BX-008-1:

1) the first packet: DA is 0x80000x00000x0000 0x0002, SA is 0x00000x00000x0000 0x0000, reserved is 0x0000, and PDU part is as shown in the following table:

| | | | 8b54 |
|---|---|---|---|
| Field Number | Length | Code | Description |
| 0 | 1W | 8b54 | port configuration command of access switch (node server →access switch) |
| 1 | 1W | | device type (BX-008) |
| 2-5 | 4W | | address of port to be opened: 0x1000 0x0000 0x0000 0x0009 |
| 6 | 1W | | operation mode: "10 0000 0000", which represents that uplink port 9 is opened |
| 7-10 | 4W | | 0000 |
| 11 | 1W | | data type 0x10 |
| 12 | 1W | | access switch address (access network address) 0x0002 |
| 13-15 | 3W | | device flag of access switch |
| 16-31 | 18W | | 0000 | the second packet: DA is 0x80000x00000x0000 0x0002, SA is 0x00000x00000x0000 0x0000, reserved is 0x0000, and PDU part is as shown in the following table:

| 8b54 | | | |
|---|---|---|---|
| Field Number | Length | Code | Description |
| 0 | 1W | 8b54 | port configuration command of access switch (node server →access switch) |
| 1 | 1W | | device type (BX-008) |
| 2-5 | 4W | | address of port to be opened: 0x1000 0x0000 0x0000 0x0012 |
| 6 | 1W | | operation mode: "00 0000 0010", which represents that port 1 is opened |
| 7-10 | 4W | | 0000 |
| 11 | 1W | | data type 0x10 |
| 12 | 1W | | access switch address (access network address) 0x0002 |
| 13-15 | 3W | | device flag of access switch |
| 16-31 | 18W | | 0000 |

Packet sent to set-top box STB-0 (service processing command, and coding/decoding command in this example):
wherein, DA is 0x80000x00000x0000 0x0009, SA is 0x00000x00000x00000x0000, reserved is 0x0000, and PDU part is as shown in the following table:

| 8704 | | | |
|---|---|---|---|
| Field Number | Length | Code | Description |
| 0 | 1W | 8704 | coding/decoding command (node server →source terminal) |
| 1 | 1W | | to be filled |
| 2-4 | 3W | | to be filled |
| 5-7 | 3W | | to be filled |
| 8 | 1W | | to be filled |
| 9-11 | 3W | | to be filled |
| 12 | 1W | | to be filled |
| 13 | 1W | | 0x3217 |
| 14 | 1W | | 0x3217 |
| 15-18 | 4W | | 0x1000 0x0000 0x0000 0x0012 |
| 19-22 | 4W | | 0x1000 0x0000 0x0000 0x0009 |
| 23 | 1W | | 0xffff = maintaining the original state |
| 24 | 1w | | 0 = alarm shut down |
| 25 | 1W | | 0xffff = maintaining the original state |
| 26 | 1W | | 0xffff = maintaining the original state |
| 27-31 | 5w | | 0 |

Packet sent to STB-1 (service processing command, and coding/decoding command in this example):
wherein, DA is 0x80000x00000x0000 0x0012, SA is 0x00000x00000x00000x0000, reserved is 0x0000, and PDU part is as shown in the following table:

| 8704 | | | |
|---|---|---|---|
| Field Number | Length | Code | Description |
| 0 | 1W | 8704 | coding/decoding command (node server →target terminal) |
| 1 | 1W | | to be filled |
| 2-4 | 3W | | to be filled |
| 5-7 | 3W | | to be filled |
| 8 | 1W | | to be filled |
| 9-11 | 3W | | to be filled |
| 12 | 1W | | to be filled |
| 13 | 1W | | 0x3217 |
| 14 | 1W | | 0x3217 |
| 15-18 | 4W | | 0x1000 0x0000 0x0000 0x0009 |
| 19-22 | 4W | | 0x1000 0x0000 0x0000 0x0012 |
| 23 | 1W | | 0xffff = maintaining the original state |
| 24 | 1w | | 0 = alarm shut down |
| 25 | 1W | | 0xffff = maintaining the original state |
| 26 | 1W | | 0xffff = maintaining the original state |
| 27-31 | 5w | | 0 |

In the PDU of the above coding/decoding command, Field Number 13 represents coding type: 0=stopping coding, 0ffff=maintaining the original state, 0xfffe=returning data decoded, without coding locally; Field Number 14 represents decoding type: 0=stopping decoding, 0ffff=maintaining the original state; Field Number 15-18 represents coding address (DA or multicast address): 0xffff=maintaining the original state; Field Number 19-22 represents decoding address (DA or multicast address): 0xffff=maintaining the original state; Field Number 23 represents: HB: coded HDA, LB: decoded HAD; 0xffff maintaining the original state; Field Number 24 represents alarm parameter: 0=alarm shut down, 1=alarm enabled, 0xffff=maintaining the original state; Field Number 25 represents holder operating parameter: 0xffff=maintaining the original state; Field Number 26 represents auxiliary channel operating parameter: 0xffff=maintaining the original state.

Wherein, the coding type is as shown in the following table:

| Code | Video Compression | Video System | Audio Compression | Flow Level |
|---|---|---|---|---|
| 0x3215 | MPEG4 | PAL | MP3 | 1.7M |
| 0x3217 | MPEG4 | PAL | MP3 | 3.3M |
| 0x3218 | MPEG4 | PAL | MP3 | 6.6M |

S5) According to the configuration of table 0 on node server MSS-400 and the configuration of table 0 on access switch BX-008-0 and BX-008-1, the above 4 packets sent to the access switch will be respectively oriented to BX-008-0 and BX-008-1.

In such a case, access switch BX-008-0 configures its own table 2 as follows:
"10 0000 0000 0001 0010"=>"10 0000 0000", i.e., a unicast data packet with a destination address (DA) of 0x10000x00000x0000 0x0012 is oriented to port 9;
"10 0000 0000 0000 1001"=>"00 0000 0001", i.e., a unicast data packet with a destination address (DA) of 0x10000x00000x0000 0x0009 is oriented to port 0;

Access switch BX-008-1 configures its own table 2 as follows:
"10 0000 0000 0001 0010"=>"00 0000 0010", i.e., a unicast data packet with a destination address (DA) of 0x10000x00000x00000x0012 is oriented to port 1;
"10 0000 0000 0000 1001"=>"10 0000 0000", i.e., a unicast data packet with a destination address (DA) of 0x10000x00000x0000 0x0009 is oriented to port 9;

According to the configuration of table 0 on node server MSS-400 and the configuration of table 0 on access switch BX-008-0 and BX-008-1, the latter 2 packets sent to the set-top box will be respectively oriented to set-top boxes STB-0 and STB-1. After receiving the packet, set-top boxes STB-0 and STB-1 may start coding/decoding according to the content of the packet, and receive and send unicast data.

Specifically, after the communication link of the current service is configured, the process in which set-top boxes STB-0 and STB-1 receive and send unicast data based on the communication link is as follows:

1) Set-top box STB-0 sends a unicast data packet to set-top box STB-1, wherein DA of the packet is 0x10000x00000x0000 0x0012, and SA is 0x00000x00000x00000x0009;

2) The unicast data packet enters access switch BX-008-0, and the switching engine module of access switch BX-008-0 looks up in table 2 according to a combined address field, wherein the table address is "10 0000 0000 0001 0010", the output of the item is "10 0000 0000" ("10 0000 0000 0001 0010"=>"10 0000 0000", i.e., a unicast data packet with a destination address (DA) of 0x10000x00000x00000x0012 is oriented to port 9), which represents that uplink port 9 is opened, and the current unicast data packet enters node server MSS-400 via port 9;

3) After node server MSS-400 receives the unicast data packet, its switching engine looks up in table 2 according to a combined address field, wherein the table address is "10 0000 0000 0001 0010", the output of the item is "000 0000 0010" ("10 0000 0000 0001 0010"=>"000 0000 0010", i.e., a unicast data packet with a destination address (DA) of 0x10000x00000x0000 0x0012 is oriented to port 1), which represents that downlink port 1 is opened, and the current unicast data packet enters access switch BX-008-1 via port 1;

4) After access switch BX-008-1 receives the unicast data packet, its switching engine module looks up in table 2 according to a combined address field, wherein the table address is "10 0000 0000 0001 0010", the output of the item is "00 0000 0010" ("10 0000 0000 0001 0010"=>"00 0000 0010", i.e., a unicast data packet with a destination address (DA) of 0x10000x0000 0x00000x0012 is oriented to port 1), which represents that downlink port 1 is opened, and the current unicast data packet enters set-top box STB-1 via port 1;

Set-top box STB-1 sends a unicast data packet to set-top box STB-0, wherein DA of the packet is 0x10000x00000x0000 0x0009, and SA is 0x00000x00000x0000 0x0012;

6) The unicast data packet enters access switch BX-008-1, and the switching engine module of access switch BX-008-1 looks up in table 2 according to a combined address field, wherein the table address is "10 0000 0000 0000 1001", the output of the item is "10 0000 0000" ("10 0000 0000 0000 1001"=>"10 0000 0000", i.e., a unicast data packet with a destination address (DA) of 0x10000x00000x0000 0x0009 is oriented to port 9), which represents that uplink port 9 is opened, and the current unicast data packet enters node server MSS-400 via port 9;

7) After node server MSS-400 receives the unicast data packet, its switching engine looks up in table 2 according to a combined address field, wherein the table address is "10 0000 0000 0000 1001", the output of the item is "000 0000 0001" ("10 0000 0000 0000 1001"=>"000 0000 0001", i.e., a unicast data packet with a destination address (DA) of 0x10000x00000x0000 0x0009 is oriented to port 0), which represents that downlink port 0 is opened, and the current unicast data packet enters access switch BX-008-0 via port 0;

8) After access switch BX-008-0 receives the unicast data packet, its switching engine module looks up in table 2 according to a combined address field, wherein the table address is "10 0000 0000 0000 1001", the output of the item is "00 0000 0001" ("10 0000 0000 0000 1001"=>"00 0000 0001", i.e., a unicast data packet with a destination address (DA) of 0x10000x0000 0x0000 0x0009 is oriented to port 0), which represents that downlink port 0 is opened, and the current unicast data packet enters set-top box STB-0 via port 0.

An simple example in which unicast service communication is realized in the above process:

It is hypothesized that STB-0 requests to server MSS-400 for sending a videophone to STB-1, and the service request packet sent by STB-0 to MSS-400 contains the type of the service requested (which is videophone in this example, so it contains the number of the opposite party, for example, 8888 8888 8888)

After server MSS-400 receives the service request packet, it checks the service type and knows that the service type is videophone, and then it skips to the videophone service process; according to the number of the opposite party (8888 8888 8888), server MSS-400 may obtain the access network address of STB-1 (because at the time STB-1 accesses the network, server MSS-400 will update the content of CAM and update address 0x0012 to 8888 8888 8888) by looking up in the CAM; the topology information of STB-0 and STB-1 may be known by looking up in the address information table according to the access network address of STB-0 and STB-1, and from 0x0009, it may be know that STB-0 is connected with Port 0 of BX-008-0, and the uplink and downlink flow is 0, the link flow is 100 Mbit/s; access network address of BX-008-0 is 0x0001, and it may be known by looking up in the address information table that BX-008-0 is connected with port 0 of MSS-400, the uplink and downlink flow is 0, and the link flow is 100 Mbit/s; the link flow information of STB-1 may be known by the same token, and the uplink and downlink bandwidth that requests for videophone is 2 Mbit/s, which meets the requirement; and then other information is checked, if it meets the requirement, the server opens the paths directed to said 2 paths of unicast data of all switches between the called set-top box and the calling set-top box (including address matching and accurate flow control on Port 0 of BX-008-0 and Port 1 of BX-008-1), the link flow information for looking up in the address information table is modified, and the server sends a coding/decoding command to the two parties of set-top boxes.

3.1.2 An example of the communication connection process in which an access network device performs multicast communication service:

As shown in FIG. 3, it is hypothesized that there exists a node server MSS-400 (with an access network address of 0x0000), and port 0 thereof is connected with an access switch BX-008-0 (with an access network address of 0x0001), port 1 thereof is connected with an access switch BX-008-1 (with an access network address of 0x0002), and port 0 of BX-008-0 is connected with a set-top box STB-0 (with an access network address of 0x0009), the number of STB_0 is 0x6666 0x6666 0x6666, port 1 of BX_008-1 is connected with a set-top box STB-1 (with an access network address of 0x0012), and the number of STB_1 is 0x8888 0x8888 0x8888. Set-top box STB_0 requests to node server MSS-400 for initiating living broadcast in the following steps:

S1) Set-top box STB_0 issues a service request protocol packet for initiating living broadcast, wherein DA of the packet is 0x08000x00000x0000 0x0000, SA is 0x00000x0000 0x0000 0x0009, reserved is 0x0000 (reserved word), and the PDU part is as shown in the following table:

| 8e01 | | | |
|---|---|---|---|
| Field Number | Length | Code | Description |
| 0 | 1W | 8e01 | terminal request instruction (terminal →node server) |
| 1 | 1W | | service type (service_type) |
| 2-4 | 3W | | terminal number (number of requestor) 0000 |

8e01

| Field Number | Length | Code | Description |
|---|---|---|---|
| 5 | 1W | | terminal extension number (extension number of requestor) 0000 |
| 6-31 | 26W | | #define SERVICE_TYPE_ORG_CAST_REQUEST 0x8009, requesting for originating a living broadcast |

S2) According to the configuration of table 1 on access switch BX-008-0 connected between set-top box STB_0 and node server MSS-400, the service request protocol packet is oriented to node server MSS-400, the service request protocol packet is oriented to node server MSS-400, node server MSS-400 determines that a request for initiating living broadcast (service type) is received according to the content of the packet, knows that the user (source terminal) is STB_0 by looking up in a CAM table (content-address mapping table) according to the service number, and knows the link topology related to the current service according to its internal address information table, and it determines that the link is permitted and living broadcast may be initiated, then it allocates a multicast address of 0x0008. Moreover, the node server sends a port configuration command to all access switches on the current communication link for requesting to open the uplink of the address of the opposite party and the downlink of the address of its own simultaneously. At this point, it knows that only access switch BX-008-0 needs to be configured at present by link topology determination.

In such a case, the node server MSS-400 sends a packet to access switch BX-008-0:

wherein, DA is 0x80000x00000x00000x0001, SA is 0x00000x00000x00000x0000, reserved is 0x0000 (reserved word), and the PDU part is as shown in the following table:

8b54

| Field Number | Length | Code | Description |
|---|---|---|---|
| 0 | 1W | 8b54 | port configuration command of access switch (node server ->access switch) |
| 1 | 1W | | device type (BX-008) |
| 2-5 | 4W | | 0x7800 0x0000 0x0000 0x0008 |
| 6 | 1W | | "00 0000 0001", which represents that port 0 is opened |
| 7-10 | 4W | | 0000 |
| 11 | 1W | | data type 0x78 |
| 12 | 1W | | access switch address (access network address) 0x0001 |
| 13-15 | 3W | | device flag of access switch |
| 16-31 | 18W | | 0000 |

Node server MSS-400 sends a packet to set-top box STB-0 (service processing command, and coding/decoding command in this example):

wherein, DA is 0x80000x00000x0000 0x0009, SA is 0x00000x00000x00000x0000, reserved is 0x0000, and PDU part is as shown in the following table:

8704

| Field Number | Length | Code | Description |
|---|---|---|---|
| 0 | 1W | 8704 | coding/decoding command (node server →set-top box) |
| 1 | 1W | | to be filled |
| 2-4 | 3W | | to be filled |
| 5-7 | 3W | | to be filled |
| 8 | 1W | | to be filled |
| 9-11 | 3W | | to be filled |
| 12 | 1W | | to be filled |
| 13 | 1W | | 0x3217 |
| 14 | 1W | | 0x3217 |
| 15-18 | 4W | | 0x7800 0x0000 0x0000 0x0008 |
| 19-22 | 4W | | 0x7800 0x0000 0x0000 0x0008 |
| 23 | 1W | | 0xffff = maintaining the original state |
| 24 | 1w | | 0 = alarm shut down |
| 25 | 1W | | 0xffff = maintaining the original state |
| 26 | 1W | | 0xffff = maintaining the original state |
| 27-31 | 5w | | 0 |

S3) According to the configuration of table 0 on node server MSS-400, the packet sent to access switch BX-008-0 will be oriented to BX-008-0. In such a case, BX-008-0 configures its own table 3 as follows:

"11 0000 0000 0000 1000"=>"00 0000 0001", i.e., a multicast data packet with a destination address (DA) of 0x78000x00000x0000 0x0008 is oriented to port 0;

S4) According to the configuration of table 0 on node server MSS-400 and the configuration of table 0 on access switch BX-008-0, the packet sent to set-top box STB-0 will be oriented to STB-0. STB-0 starts coding/decoding according to the content of the packet, and starts receiving and sending multicast data.

Specifically, the process in which set-top box STB-0 initiates a communication link to receive and send multicast data based on the current living broadcast is as follows:

1) Set-top box STB-0 issues a multicast data packet, wherein DA of the packet is 0x7800 0x00000x0000 0x0008 (multicast address), and SA is 0x00000x00000x0000 0x0009;

2) The multicast data packet enters access switch BX-008-0, the switching engine module of access switch BX-008-0 looks up in table 3 according to a combined address field, wherein the table address is "11 0000 0000 0000 1000", the output of the item is "00 0000 0001" ("11 0000 0000 0000 1000"=>"00 0000 0001", i.e., a multicast data packet with a destination address (DA) of 0x7800 0x00000x0000 0x0008 is oriented to port 0), which represents that downlink port 0 is opened, and the current multicast data packet enters set-top box STB-0 via port 0.

Set-top box STB_1 requests to node server MSS-400 for watching living broadcast in the following steps, with a number of 0x6666 0x6666 0x6666:

S1) Set-top box STB_1 issues a service request protocol packet for watching living broadcast, wherein DA of the packet is 0x08000x00000x00000x0000, SA is 0x00000x0000 0x0000 0x0012, reserved is 0x0000, and PDU part is as shown in the following table:

8e01

| Field Number | Length | Code | Description |
|---|---|---|---|
| 0 | 1W | 8e01 | user request instruction (terminal →node server) |
| 1 | 1W | | service type (service_type) |

-continued

| 8e01 | | | |
|---|---|---|---|
| Field Number | Length | Code | Description |
| 2-4 | 3W | | terminal number (number of requestor) 0x6666 0x6666 0x6666 |
| 5 | 1W | | terminal extension number (extension number of requestor) 0000 |
| 6-31 | 26W | | #define SERVICE_TYPE_RCV_CAST_DIRECT 0x8025, requesting for watching living broadcast |

S2) According to the configuration of table 1 on access switch BX-008-1 connected between set-top box STB_1 and node server MSS-400, the service request protocol packet is oriented to node server MSS-400, and node server MSS-400 determines that a request for watching living broadcast is received according to the content of the packet, knows that the initiator (source terminal) is STB_0 by looking up in a CAM table according to the service number, and knows the link topology related to the current service according to its internal address information table, and it determines that the link is permitted and living broadcast may be watched, then it allocates a multicast address (corresponding to the multicast address allocated to the source terminal) of 0x0008. Moreover, the node server sends a port configuration command to all access switches on the current communication link for requesting to open the uplink of the address of the opposite party and the downlink of the address of its own simultaneously. In such a case, node server MSS-400 configures its own table 3 as follows:

"11 0000 0000 0000 1000"=>"000 0000 0010", i.e., a multicast data packet with a destination address (DA) of 0x78000x00000x0000 0x0008 is oriented to port 1;

At the same time, node server MSS-400 sends a packet to access switch BX-008-0:

wherein, DA is 0x80000x00000x00000x0001, SA is 0x00000x00000x00000x0000, reserved is 0x0000, and PDU part is as shown in the following table:

| 8b54 | | | |
|---|---|---|---|
| Field Number | Length | Code | Description |
| 0 | 1W | 8b54 | port configuration command of access switch (node server →access switch) |
| 1 | 1W | | device type (BX-008) |
| 2-5 | 4W | | 0x7800 0x0000 00000 0x0008 |
| 6 | 1W | | "10 0000 0001", which represents that port 9 is opened |
| 7-10 | 4W | | 0000 |
| 11 | 1W | | data type 0x78 |
| 12 | 1W | | access switch address (access network address) 0x0001 |
| 13-15 | 3W | | device flag of access switch |
| 16-31 | 18W | | 0000 |

At the same time, node server MSS-400 sends a packet to access switch BX-008-1:

Wherein, DA is DA is 0x80000x00000x0000 0x0002, SA is 0x00000x00000x0000 0x0000, reserved is 0x0000, and PDU part is as shown in the following table:

| 8b54 | | | |
|---|---|---|---|
| Field Number | Length | Code | Description |
| 0 | 1W | 8b54 | port configuration command of access switch (node server →access switch) |
| 1 | 1W | | device type (BX-008) |
| 2-5 | 4W | | 0x7800 0x0000 0x0000 0x0008 |
| 6 | 1W | | "00 0000 0010" represents port 1 |
| 7-10 | 4W | | 0000 |
| 11 | 1W | | data type 0x78 |
| 12 | 1W | | access switch address (access network address) 0x0002 |
| 13-15 | 3W | | device flag of access switch |
| 16-31 | 18W | | 0000 |

At the same time, node server MSS-400 sends a packet to set-top box STB-1:

Wherein, DA is DA is 0x80000x00000x0000 0x0012, SA is 0x00000x00000x0000

0x0000, reserved is 0x0000, and PDU part is as shown in the following table:

| 8704 | | | |
|---|---|---|---|
| Field Number | Length | Code | Description |
| 0 | 1W | 8704 | coding/decoding command (node server →terminal) |
| 1 | 1W | | to be filled |
| 2-4 | 3W | | to be filled |
| 5-7 | 3W | | to be filled |
| 8 | 1W | | to be filled |
| 9-11 | 3W | | to be filled |
| 12 | 1W | | to be filled |
| 13 | 1W | | 0 |
| 14 | 1W | | 0x3217 |
| 15-18 | 4W | | 0xffff |
| 19-22 | 4W | | 0x7800 0x0000 0x0000 0x0008 |
| 23 | 1W | | 0xffff = maintaining the original state |
| 24 | 1w | | 0 = alarm shut down |
| 25 | 1W | | 0xffff = maintaining the original state |
| 26 | 1W | | 0xffff = maintaining the original state |
| 27-31 | 5w | | 0 |

S3) According to the configuration of table 0 on node server MSS-400, the packets sent to access switches BX-008-0 and BX-008-1 will be respectively oriented to access switches BX-008-0 and BX-008-1.

In such a case, access switch BX-008-0 configures its own table 3 as follows:

"11 0000 0000 0000 1000"=>"10 0000 0001", i.e., a multicast data packet with a destination address (DA) of 0x78000x00000x0000 0x0008 is oriented to port 0 and port 9;

Access switch BX-008-1 configures its own table 3 as follows:

"11 0000 0000 0000 1000"=>"00 0000 0010", i.e., a multicast data packet with a destination address (DA) of 0x78000x00000x0000 0x0008 is oriented to port 1;

S4) According to the configuration of table 0 on node server MSS-400 and the configuration of table 0 on access switch BX-008-1, the packet sent to set-top box STB-1 will be oriented to STB-1. STB-1 receives multicast data and decodes the data according to the content of the packet.

Specifically, the process in which set-top box STB-1 receives multicast data based on the current communication link on which living broadcast is watched is as follows:

1) Set-top box STB-0 issues a multicast data packet, wherein DA of the packet is 0x7800 0x00000x0000 0x0008 (multicast address), and SA is 0x00000x00000x0000 0x0009;

2) The multicast data packet enters access switch BX-008-0, the switching engine module of access switch BX-008-0 looks up in table 3 according to a combined address field, wherein the table address is "11 0000 0000 0000 1000", the output of the item is "10 0000 0001" ("11 0000 0000 0000 1000"=>"10 0000 0001", i.e., a multicast data packet with a destination address (DA) of 0x78000x00000x0000 0x0008 is oriented to port 0 and port 9), which represents that downlink port 0 and uplink port 9 are opened, and the current multicast data packet enters set-top box STB-0 via port 0, and enters node server MSS-400 via port 9;

3) After node server MSS-400 receives the multicast data packet, its switching engine module looks up in table 3 according to a combined address field, wherein the table address is "11 0000 0000 0000 1000", the output of the item is "000 0000 0010" ("11 0000 0000 0000 1000"=>"000 0000 0010", i.e., a multicast data packet with a destination address (DA) of 0x78000x0000 0x0000 0x0008 is oriented to port 1), and the current multicast data packet enters access switch BX-008-1 via port 1;

4) After access switch BX-008-1 receives the multicast data packet, its switching engine module looks up in table 3 according to a combined address field, wherein the table address is "11 0000 0000 0000 1000", the output of the item is "00 0000 0010" ("11 0000 0000 0000 1000"=>"00 0000 0010", i.e., a multicast data packet with a destination address (DA) of 0x78000x0000 0x0000 0x0008 is oriented to port 1), which represents that downlink port 1 is opened, and the current multicast data packet enters set-top box STB-1 via port 1.

However, the above unicast service communication process and multicast service communication process are only examples. In practice, it is feasible to perform any unicast service communication or multicast service communication by employing the embodiments of the invention.

For one skilled in the art to better understand the invention, several examples in which service communication is performed by employing the embodiments of the invention will be provided below.

3.1.3 An Example of the Service Process of an Access Network 3.1.3.1 Broadcast Interaction Process There are two types of terminal devices related to broadcast process: code plate (broadcast source), and set-top box (the party that watches broadcast).

After a code plate accesses the network via a network access process, the node server will send a command that indicates the code plate to start coding. Each code plate codes a path of broadcast data.

Start Watching:

After entering the broadcast process, firstly, a set-top box issues a request command, and after the node server receives the request command from the set-top box, it knows that the set-top box wants to watch broadcast, and moreover, it knows which path of broadcast the set-top box wants to watch. At this point, the node server finds the route between the code plate and the set-top box. A command is sent to all switches on the route, and the paths directed to this path of broadcast data of all switches between the code plate and the set-top box are opened; at the same time, a decoding command is sent to the set-top box. Then, the set-top box may watch broadcast.

Stop Watching:

The set-top box issues a stop command, and after the node server receives the stop command from the set-top box, it find the route between the code plate and the set-top box, the paths directed to this path of broadcast data of all switches between the code plate and the set-top box are shut down pertinently (it is possible that an switch on the route has other set-top boxes that are watch the current broadcast, so it cannot shut down all the paths directly); at the same time, a stop decoding command is sent to the set-top box, and a last page menu is sent for the set-top box to return to the menu.

It should be noted that: the broadcast data received by the set-top box is totally the same as the broadcast data issued by the code plate.

3.1.3.2 VOD Interaction Process

There are two types of terminal devices related to VOD process: storage (program source), and set-top box (the party that watches VOD".

Start Watching:

After entering VOD process, firstly, a set-top box issues a request command, which gives the VOD program number. After the node server receives the request command from the set-top box, it knows that the set-top box wants to watch VOD, and moreover, it knows which program the set-top box wants to watch. It may be looked up in the internal information table of the node server that on which storage is the current program stored.

Because after the set-top box accesses the network, the address will be fixed; the VOD data watched are unicast data, and the data address will be the address of the set-top box.

The node server sends a disk reading command to the storage (which contains the program number and the unicast data address) to indicate the storage to send unicast data. If the storage finds that the program exists on the current storage, it starts to send the program, and at the same time, it sends a disk reading command reply to the node sewer, which represents that the storage has started to send program.

After the node server receives the reply from the storage, it finds the route between the storage and the set-top box, and the paths directed to this path of unicast data of all switches between the storage and the set-top box are opened, and at the same time, a decoding command is sent to the set-top box. Then, the set-top box may watch the VOD.

Stop Watching:

The set-top box issues a stop command, and after the node server receives the stop command from the set-top box, it sends a stop disk reading command to the storage to indicate the storage to stop sending unicast data. The storage stops sending, and at the same time, it sends a stop disk reading command reply to the node server, which represents that the storage has stopped sending program.

After the node server receives the reply, it finds the route between the storage and the set-top box, and the paths directed to this path of unicast data of all switches between the storage and the set-top box are opened are shut down; at the same time, a stop decoding command is sent to the set-top box, and a last page menu is sent for the set-top box to return to the menu.

3.1.3.3 Visual Communication Interaction Process

Start Visual Communication:

The calling set-top box issues a request command, which contains the number of the called set-top box.

After the node server receives the request command from the set-top box, it first queries whether the called set-top box accesses the network; if the called set-top box does not access the network, it informs the calling set-top box that the request is failed.

If the called set-top box has accessed the network, it queries whether the called set-top box is idle; if the called set-top box is not idle, it informs the calling set-top box that the request is failed.

If the called set-top box has accessed the network and is in an idle state, the node server sends a call menu to the called set-top box and waits the called set-top box to reply. The called set-top box may select to accept or refuse, and a reply is sent to the node server.

The node server receives the reply from the called set-top box. If the reply is to refuse, it informs the calling set-top box that the request is failed.

If the reply is to accept, the node server sends a coding/decoding command to the two parties of set-top boxes. It is required by visual communication that the two parties of set-top boxes should code/decode simultaneously. The data are unicast data, the coding address is the address of the opposite party, and the decoding address is its own address.

The node server opens the paths directed to said 2 paths of unicast data of all switches between the called set-top box and the calling set-top box.

Stop Visual Communication

The called set-top box and the calling set-top box may both request to stop visual communication. After the node server receives the stop command from the set-top box, it shuts down the paths directed to said 2 paths of unicast data of all switches between the called set-top box and the calling set-top box. Then, it sends a stop coding/decoding command to the called set-top box and the calling set-top box respectively, and a last page menu is sent for the set-top boxes to return to the menu.

3.1.3.4 Living Broadcast Interaction Process

Initiate Living Broadcast

Data of living broadcast is also a path of broadcast data.

A set-top box issues a request command, and after the node server receives the request, it automatically allocates a path of broadcast data and sends a coding/decoding command to the set-top box; and at the same time, it instructs an upper-level switch of the current set-top box to open a path for this path of broadcast data. Then, the set-top box may watch the broadcast it initiates. The initiating party will be the watching party at the same time.

Watch Living Broadcast

A watching set-top box issues a request command, which contains the number of the party that initiates living broadcast. After the node server receives the request, it first queries whether the party that initiates living broadcast has accessed the network and whether it has initiated a living broadcast. If the conditions are not met, it informs the watching set-top box that the watch request is failed.

If the conditions are met, the node server finds the route between the party that initiates living broadcast and the watching set-top box, and it opens the paths directed to this path of broadcast data of all switches between the party that initiates living broadcast and the watching set-top box; at the same time, it sends a decoding command to the watching set-top box. Then, the set-top box may watch the living broadcast.

Stop Watching Living Broadcast

The watching set-top box issues a stop command, and after the node server receives the stop command from the watching set-top box, it finds the route between the party that initiates living broadcast and the watching set-top box, and the paths directed to this path of broadcast data of all switches between the party that initiates living broadcast and the watching set-top box are shut down pertinently (it is possible that an switch on the route has other set-top boxes that are watching the current living broadcast, so it cannot shut down all the paths directly); and at the same time, a stop decoding command is sent to the watching set-top box, and a last page menu is sent for the watching set-top box to return to the menu.

Stop Initiating Living Broadcast

The party that initiates living broadcast issues a stop command. After the node server receives the stop command, it first queries that how many users are watching the current living broadcast, and ends the process of all the users that are watching the living broadcast according to the stop watching process, and then it sends a stop coding/decoding command to the party that initiates living broadcast; at the same time, it indicates the upper-level switch of the current set-top box to shut down the path for this path of broadcast data.

3.1.3.5 In addition to the above examples, the following service communication applications may also be realized in the embodiments of the invention.

1. Controllable Broadcast

1) Broadcast and Restricted Broadcast: (Multicast Service)

Node Server maintains a broadcast operation table.

Broadcast Source: real-time analog encoder, real-time digital converter and stored programs.

Node Server, restricted broadcast viewer counter, new viewers will be rejected after it exceeds a set value.

Node Server carries out authentication of restricted broadcast user group.

After a user terminal enters watching, an OSD menu may be displayed according to HLP key, and the broadcast content may be stored into an individual mailbox.

Controllable broadcast may provide a service selectively to only a part of the users (for example, charged channel).

Controllable broadcast may count the audience rating at any moment (even viewer-classified audience rating).

Restricted broadcast: a wide price range may be set for thousands of broadcast channels according to different restricted values, which may be rented to commercial clients (advertisement and education, etc.) in large amounts.

2) Vote Feedback (which May be Pay-Per-View)

A media center MPC edits and records the content of OSD.

A node server periodically sends the content of OSD with the same address (DA) as the broadcast remote resource.

A user set-top box forwards the feedback value of a remote control according to the content of OSD displayed via HLP key.

A user proxy server receives the user feedback and user information table record (multicast DA, score and ballot).

The user proxy server searches in the user information table each second, and sends the user vote result to the node server.

Viewer Feedback Information: total participating man-time, ballot number and viewer rating (YES/NO or 5 points system) at each target point. The vote feedback on a broadcast channel may be used for designed questionnaire public-opinion poll and future star mass-election, etc.

2. VOD and MOD: (Unicast Service)

3) Process Operation of VOD

A node server edits and records a VOD confirmation content, which contains program information, price information and viewer feedback information).

After receiving a user request, the node server sends a VOD confirmation menu and the content of OSD.

A user set-top box forwards the feedback value of a remote control according to the content of OSD displayed via HLP key (program play location and rating prompt).

The user proxy server records the user information table, and sends the user rating result to the node server after VOD is ended.

The user set-top box performs play operation (pause/play, continuous fast forward/fast rewind, 15-minute forward/rewind).

Viewer Feedback Information: total click number, and viewer rating (5 points system).

VOD Service: the content may be mass media, or alternative media (TV Blog, professional education and product operation maintenance, etc.)

4) Kara-Ok:

It is the same as VOD, wherein audio employs independent double tracks.

5) TV Magazine (MOD):

A node server adds voiced text on demand and voiced picture on demand based on VOD.

The node server arranges or selects a plurality of media contents in an order.

6) Interactive Multimedia Website:

A user proxy server is equipped with a mailbox opened to the public for receiving picture, text and voice feedback from readers.

Interactive multimedia website may be a window of an enterprise or the government that is opened to the public (electronic government affairs).

3. TVOD (Controllable Broadcast+VOD): (Multicast+Unicast Service)

7) Centralized Monitoring:

A media center or a user proxy server MPC edits and maintains a monitor operation table, and it may be selected to switch on video recording periodically.

After a user terminal enters watching, it may store the monitor content into an individual mailbox according to an OSD menu displayed via HLP key.

Centralized monitoring may be applicable to large-scale remote monitoring, and a safety ensurance service may be provided to a plurality of companies at the same time via user group separation.

8) TV Playback (Network TiVo):

A user proxy memory may store all the contents in recent 3-7 days of tens of channels.

After a user terminal enters watching, it may store the program content into an individual mailbox according to an OSD menu displayed via HLP key.

TV playback: A user may watch TV in VOD mode and select any program content in recent 7 days at any moment.

9) Well-Chosen Program

A media center MPC edits and maintains a well-chosen broadcast program table, classifies programs periodically and records automatically.

A user proxy memory may store all contents of tens of splendid programs in recent 60 days.

After a user terminal enters watching, it may store the program content into an individual mailbox according to an OSD menu displayed via HLP key.

Well-Chosen Program: TV programs are classified and stored automatically, and edited into a menu form for convenient watching by consumers.

4. Living Broadcast: (Multicast Service)

1) Simple Living Broadcast:

A user proxy server in living broadcast is the same as that in restricted broadcast.

The user proxy server may record a living broadcast content under the control of a living broadcast terminal.

Living Broadcast: viewers may be network-wide, and the broadcast source is set in the customer site.

2) Video Chat, Web Classroom and Citizen Hotline:

After entering a chat room, a participating-party terminal may request for video upload according to the content of OSD displayed via HLP key, and present flowers to an anchorman.

The anchoring-party user proxy server records the user request, and sends an OSD prompt to an living broadcast terminal.

A living broadcast-party terminal may display multiple video upload request OSDs, select a path to upload via a remote control, and automatically shut down the previous path.

The user proxy server sends a special charging packet to a running account when video upload is shut down.

The user proxy server records the flower presentation value of the user, notifies the living broadcast party, and sends a special charging packet to a running account when video upload is shut down.

After entering a chat room, a user presents flowers and participates in audio conversation; the cost for opening video conversation is automatically stored into an individual mailbox proportionally.

Video Chat: the image broadcasted by the anchorman at home (on site) may reach network-wide, the anchorman may see viewer requests and hear multiple viewer audios, but only 1 path of viewer image can be seen selectively.

A viewer obtains a chat room via a program table and dials in; the viewer may present flowers to the anchorman (charged additionally) and request for audio or video conversation.

3) Shopping Channel:

A living broadcast terminal or an MPC connected therewith maintains the shopping information (commodities and clients).

After entering a shopping channel, a user terminal displays an OSD order (commodity, specification, number and price) via HLP key.

The user terminal fills in and submits an order via a remote control.

After receiving the order, the user proxy server forwards it to a living broadcast-party terminal or an MPC connected therewith.

The living broadcast-party terminal or the MPC authenticates the order and returns the confirmed order to the user.

The user terminal displays the order again, and confirms via a remote control.

The user proxy server sends the user confirmation to the living broadcast party, and sends a special charging packet to a running account when video upload is shut down.

After a user terminal enters watching, it may store the shopping content into an individual mailbox according to an OSD menu displayed via HLP key.

MPC is a PC machine installed with special software for reinforcing the operating performance of a TVset-top box.

4) Auction Channel:

A living broadcast terminal or an MPC maintains the auction information (commodities and clients).

After entering an auction channel, a user terminal displays an OSD introduction (commodity, specification and ceiling price) via HLP key.

The user terminal fills in and submits a bid via a remote control.

After receiving the bid, the user proxy server forwards it to the living broadcast-party terminal or the MPC.

The living broadcast-party terminal or the MPC connected therewith authenticates the user bid and returns the confirmed bit to the user.

The user terminal displays the bid again and confirms via a remote control.

The user proxy server sends the user confirmation to the living broadcast party, and sends a special charging packet to a running account when video upload is shut down.

After a user terminal enters watching, it may store the auction content into an individual mailbox according to an OSD menu displayed via HLP key.

MPC is a PC machine installed with special software, which is connected directly with a terminal for reinforcing the operating performance of a TVset-top box.

5) Video Call Center:

A living broadcast-party terminal or an MPC connected therewith binds multiple paths of video chat to a number (or name) for resource sharing.

The video call center may be directly linked to a shopping channel or an auction channel for providing a subsequent service.

5. Conference (Multiple Paths of Living Broadcast Bond Together): (Multicast Service)

A conference initiating-party terminal or an MPC connected therewith edits and maintains a conference operation table, and realizes the binding of multiple paths of processes.

1) Speech on a General Meeting:

An initiating-party terminal directly controls the designated participating-party terminals, and shuts down the remote operation of the participating party in order to force it to participate passively.

Initiating-party speech is realized compulsively, and the participating party is forced to watch the speech.

The initiating-party terminal may watch any participating-party or designate it to speak without informing the participating party in advance.

Speech on a General Meeting is applicable to leader report, engineering event direction, and routine dispatch meeting between enterprise headquarters and remote subdivisions.

2) Classroom Teaching:

Any participating-party terminal may issue a speech request to the initiating-party terminal, and it may speak after being authorized by the initiating party.

Classroom teaching may realize a conference chat room, and the difference from living broadcast chat room lies in that: a living broadcast viewer always watches the supporter, while a conference chat viewer watches the speaker or watches the supporter and the speaker simultaneously via a multi-screen terminal.

3) Round-Table Discussion:

Any participating-party terminal may interrupt others and scrambles for speaking (without being interrupted for at least 10 seconds) by pressing a single ENTER key.

Round-table discussion may realize a conference chat room, and the difference from living broadcast chat room lies in that: a living broadcast viewer always watches the supporter, while a conference chat viewer watches the speaker or watches the supporter and the speaker simultaneously via a multi-screen terminal.

4) Multi-Screen Conference:

A user proxy server may insert a VOD.

A PBOX terminal must be used, which can display the initiating party (chairman), the speaker, the local meeting place, VOD or the screen of a PC simultaneously.

A conference mode, for example, general meeting speech, classroom teaching and round-table discussion, etc., may be selected.

5) TV Wall:

It may display the initiating party (chairman), the speaker, multiple branch meeting places, VOD or a PC screen at the same time.

A conference mode, for example, general meeting speech, classroom teaching and round-table discussion, etc., may be selected.

6. Video Telephone: (Unicast Service)

6) Ordinary Video Telephone:

A user proxy server maintains a telephone-number list, and it supports ordinary dialing and compulsive dialing.

After entering a conversation, a user terminal may store the communication content into a mailbox according to an OSD menu displayed via HLP key, and it may select or adjust the camera angle of the opposite party.

7) Collect Videophone (Video 800)

A number of this type starts with 800, which is free for users. The other aspects are the same as those of an ordinary videophone.

Collect videophone is applicable to advertisements, client services and commonweal service, etc.

8) Video Service Telephone (video 900):

A number of this type starts with 900, the calling party is an ordinary user terminal, and the service charge thereof contains a high content fee (in seconds) in addition to communication fee. The other aspects are the same as those of an ordinary videophone.

The called party is a content provider (the content includes real-time communication, VOD and TV magazine).

9) Home Monitoring:

Home monitoring is a unidirectional communication that is realized via a user proxy server, and it may be performed with other services simultaneously so long as the video sending resources do not conflict with each other.

After dialing and entering the monitoring, a user terminal may store the monitoring content into a mailbox according to an OSD menu displayed via HLP key, and it may select multiple paths of cameras or adjust the camera angle of the opposite party.

A monitored terminal may set the monitoring right (that is, designating a group of numbers that are authorized to monitor, opening all numbers or barring all numbers).

Home monitoring is applicable to homes, small shops and bank branches, etc.

7. TV Mail and TV Blog: (Unicast Service)

10) Individual Network Storage

A user proxy server maintains the mailbox list of a user.

A user terminal uploads the content, including video, audio, picture and text, which is saved in the mailbox in the form of a draft and may be called out and viewed at any moment.

The upload content may be input via a USB port (which may be directly connected to a PC, a USB Disk and a removable hard disk, etc.).)

11) Ordinary Video Mail:

A user terminal designates a content in the mailbox, inputs the number of a sending object, and requests to send the mail.

The user proxy server issues a new mail notification to the sending object, but in fact, it dose not forward the mail content. VOD operation is only executed when the receiving-party terminal watches the content.

If the receiving-party terminal requests to save the mail content for a long time, the content may be stored into the mailbox according to an OSD menu displayed via HLP key.

12) Short Message and Voice Message:

It will be processed like a video mail, and the content may be stored in a dedicated VDOS-SD storage device.

13) TV Blog:

The node server classifies and maintains a public large mailbox according to contents.

A user terminal uploads a mail to the public large mailbox of a media center (including user-defined price).

A media center MPC receives and authenticates the mail uploaded, converts it into a VOD content, and registers and stores it into a Blog with a corresponding classification.

The node server maintains viewer feedback information, and maintains a VOD account bill.

If a receiving-party terminal requests to save the Blog content for a long time, the content may be stored into the mailbox according to an OSD menu displayed via HLP key.

A part of the content fee of TV Blog may be automatically transferred to the account of the content uploading party (department store mode).

8. Computer Network:

14) Internet Wideband Access

Due to the existence of an Ethernet gateway, a user may access the novel network at home via an ordinary Ethernet switch. Thus, a convergence of the Internet and the novel network may be realized by the user at home, and IP data may be connected to the public Internet.

Internet wideband access is applicable for consumers in decentralized communities.

15) Multimedia Computer Local Area Network:

Due to the existence of an Ethernet gateway, an enterprise may access the novel network via an ordinary Ethernet switch, thus a convergence of the Internet and the novel network may be realized by the enterprise.

Multimedia computer local area network is applicable for schools, enterprises and government offices.

9. Voice Telephone: (Multicast+Unicast Service)

Novel network telephone uses uncompressed PCM (G.711) directly, and it has a PSTN quality and low delay (transparent transmission FAX and Modem), but its functions ride over those of PSTN, and its cost is lower than that of IP telephone. It can meet the telephone service of all users by only occupying one percent of the bandwidth resources of the novel network.

16) Novel Network Telephone:

On-net calling of the novel network telephone: directly dialing the number of the novel network telephone.

Calling from the novel network to the PSTN network: 99+PSTN telephone number

Calling from the PSTN network to the novel network: 077+MP number (for 077 or other numbers, it cooperate with the telecommunication company).

After entering a conversation, if a user dials "***" continuously, the conversation content of the two parties will be stored into a mailbox automatically.

17) Recording Telephone:

A user may select: "if an incoming call is missed, automatically play a record in mailbox", then the call content will be recorded in the mailbox.

Monthly payment may be selected.

18) Voice Telephone Conference:

The node server is equipped with a dedicated multi-path speech synthesis device, which has clear tone colour and low delay.

A conference initiating party appoints the conference time, number of participants, corresponding numbers and off-net PSTN code, and overall recording may be selected.

The node server sends a short message notification (including conference number) to designated users.

The users dial the designated number in designated time and add in the telephone conference.

The node server automatically authenticates the time, the conference number and the user numbers, and it may automatically call the conference participating party.

19) Voice Automatic Service Center:

It is similar to the function of a multimedia website, except for being limited in voice. Generally, this function may be realized in an enterprise via 1 PC. This function can be automatically set for each user on the novel network, with no additional hardware required; and only a little monthly fee is charged.

Voice automatic service center is applicable to services such as weather, stocks, traffic, public service and client service, etc.

20) Voice Call Center:

An initiating-party terminal or an MPC connected therewith binds multiple paths of telephones to a number (or name) for resource sharing.

The initiating party may select overall recording.

21) Cable Music Broadcast Station:

It is similar to TV broadcast, except for being limited to music.

In the embodiments of the invention, both the table 0 and the table 1 are configured in the network access process. In order to make those skilled in the art understand the invention well, the network access process of the access network device will be described below.

Figure 4:
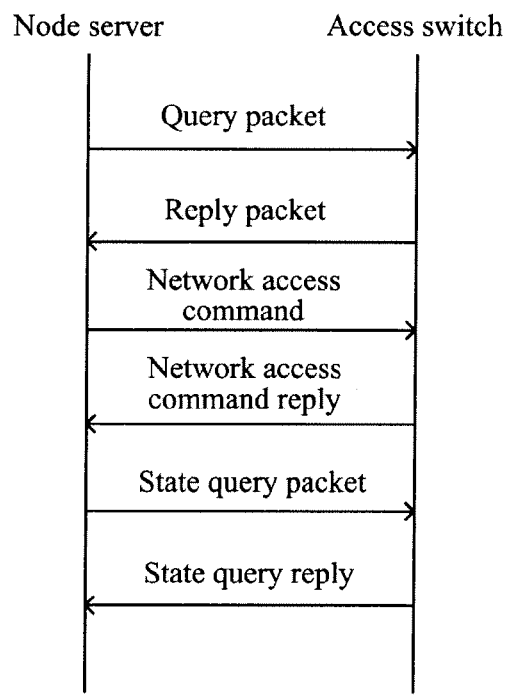
FIG. 4 is a schematic diagram showing the network access process of an access switch according to the invention.

3.1.4 The Network Access Process of an Access Network Device 3.1.4.1 The Network Access Process of an Access Switch Firstly, each access switch that is allowed to access the network must be registered on the node server, and an access switch that is not registered will be unable to access the network. As shown in FIG. 4, the process in which the access switch accesses the network relates to the following steps:

1) A node server sends a query packet to each port, and after the access switch receives the query packet, it sends a reply packet, which contains the registration information of the current access switch;

2) After the node server receives the reply packet issued by the access switch, it will know the port under which an access switch is connected, then the information of the access switch is found in an internal registration information table of the node server, a network access command is sent to the access switch (informing it of the access network address), and after the access switch receives the network access command, it accesses the network and sends a network access command reply to the node server simultaneously;

3) After the node server receives the network access command reply issued by the access switch, it will know that the access switch has accessed the network, then a state query packet is sent to the port periodically to check whether the access switch works normally, and at the same, a port query packet is sent to the downlink port of the access switch to check whether other access network devices are connected under the access switch. If the current access switch works normally, it will send a state query reply to the node server after receiving a device state query instruction. When no state query reply is received by the node server in a certain period of time, it will be considered that the access switch has been removed from the network, and no state query packet will be sent any longer; instead, it continues to send a query packet to the current port.

Figure 5:
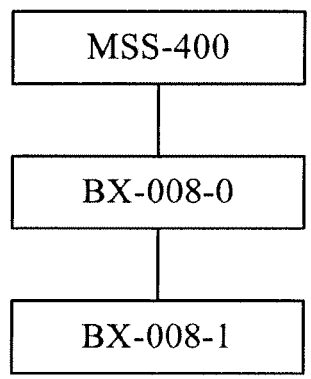
FIG. 5 is a schematic diagram showing the connection between a node server and an access switch according to the invention.

3.1.4.2 An Example of Interaction Between the Node Server and the Access Switch During a Network Access Process For easy description, it is hypothesized that the node server is not connected with the node switch, and the network access process on the metropolitan area network is neglected. For convenient discussion, it is hypothesized that the node server has 8 downlink 100M network interfaces in turn defined as port 0 to port 7, 1 CPU module interface defined as port 8, 1 disk array module interface defined as port 9 and 1 uplink 1000M fiber interface defined as port 10, and the type of this node server is MSS-400. As shown in FIG. 5, port 0 of MSS-400 is connected with BX-008-0, and port 1 of BX-008-0 is connected with BX-008-1.

S1) After server MSS-400 is powered on, it initializes the hardware, obtains the default metropolitan area network address (which is hypothesized as 0x000x00000x0000), and imports a configuration file from the hard disk to the CPU memory (for example, the registration information of an switch and the registration information of a terminal, etc.), and server MSS-400 configures its own access network address as 0x0000;

S2) Server MSS-400 initializes tables 0, 1, 2 and 3:
 configuring table 0 as "000 0000 0000", i.e., all query packet transmission is closed;
 configuring table 1 as "001 0000 0000", i.e., all reply packets are to be oriented to the CPU;
 configuring tables 2 and 3 as "000 0000 0000", i.e., all unicast or multicast data packet transmission is closed;

S3) Server MSS-400 knows that it has 8 downlink ports, so it configures the 8 items of table 0 respectively as:
 "00 0000 0000 0000 0001"=>"000 0000 0001", i.e., a query packet with a destination address (DA) of 0x80000x00000x00000x0001 is oriented to port 0;
 "00 0000 0000 0000 0010"=>"000 0000 0010", i.e., a query packet with a destination address (DA) of 0x80000x00000x0000 0x0002 is oriented to port 1;
 "00 0000 0000 0000 0011"=>"000 0000 0100", i.e., a query packet with a destination address (DA) of 0x80000x00000x0000 0x0003 is oriented to port 2;
 "00 0000 0000 0000 0100"=>"000 0000 1000", i.e., a query packet with a destination address (DA) of 0x80000x00000x0000 0x0004 is oriented to port 3;
 "00 0000 0000 0000 0101"=>"000 0001 0000", i.e., a query packet with a destination address (DA) of 0x80000x00000x0000 0x0005 is oriented to port 4;
 "00 0000 0000 0000 0110"=>"000 0010 0000", i.e., a query packet with a destination address (DA) of 0x80000x00000x0000 0x0006 is oriented to port 5;
 "00 0000 0000 0000 0111"=>"000 0100 0000", i.e., a query packet with a destination address (DA) of 0x80000x00000x0000 0x0007 is oriented to port 6;
 "00 0000 0000 0000 1000"=>"000 1000 0000", i.e., a query packet with a destination address (DA) of 0x80000x00000x0000 0x0008 is oriented to port 7;

S4) Server MSS-400 sends query packets with destination addresses (DA) of 0x8000 0x0000 0x0000 0x0001, 0x8000 0x0000 0x0000 0x0002, 0x8000 0x0000 0x0000 0x0003, 0x8000 0x0000 0x0000 0x0004, 0x8000 0x0000 0x0000 0x0005, 0x8000 0x0000 0x0000 0x0006, 0x8000 0x00000x0000 0x0007 and 0x80000x00000x0000 0x0008 (with an SA of 0x00000x0000 0x00000x0000), and according to the configuration of table 0, the query packets will be in turn oriented to ports 0 to 7;

S5) After switches BX-008-0 and BX-008-1 are powered on, they initializes the hardware:
 configuring table 0 "00 xxxx xxxx xxxx xxxx" as "01 0000 0000", i.e., all query packets are oriented to the CPU;
 configuring table 1 "01 xxxx xxxx xxxx xxxx" as "10 0000 0000", i.e., all reply packets are oriented to an uplink 100M network interface;
 configuring tables 2 and 3 as "000 0000 0000", i.e., all unicast or multicast data packet transmission is closed;

S6) After switch BX-008-0 receives a query packet, it receives the query packet to its CPU module according to the configuration of its table 0, and the CPU resolves the query packet and generates a reply packet (which contains the registration information of the current switch), and sends it to server MSS-400, wherein the DA of the reply packet is 0x08000x00000x00000x0000, and the SA is 0x00000x00000x00000x0001;

S7) After server MSS-400 receives the reply packet issued by switch BX-008-0, it will know that port 0 thereof is connected with an access switch by contrasting the source address (SA) of the reply packet to the device type, then the information of the access switch is found in an internal registration information table of the node server, and a network access command is sent to the access switch (informing that the access network address thereof is 0x0001);

S8) After switch BX-008-0 receives the network access command and knows that its own access network address is 0x0001, it accesses the network, then its table 0 "00 0000 0000 0000 0001" is configured as "01 0000 0000", and the remaining items of table 0 are configured as "00 0000 0000", that is, only the downlink protocol packet of the current switch is imported to the CPU; at the same time, a network access command reply (network access command reply packet) is sent to server MSS-400;

S9) After server MSS-400 receives the network access command reply issued by switch BX-008-0, it will know that switch BX-008-0 has accessed the network, and then a device state query instruction is sent to the port each second to check whether switch BX-008-0 works normally; and at the same, a port downlink protocol packet is sent to the downlink port of switch BX-008-0 to check whether other access network devices are connected under the current access switch. In such a case, the following configurations will be done by server MSS-400 in its table 0:
 "00 0000 0000 0000 1001"=>"000 0000 0001", i.e., a port downlink protocol packet with a destination address (DA) of 0x80000x00000x0000 0x0009 is oriented to port 0;
 "00 0000 0000 0000 1010"=>"000 0000 0001", i.e., a port downlink protocol packet with a destination address (DA) of 0x80000x00000x00000x000a is oriented to port 0;
 "00 0000 0000 0000 1011"=>"000 0000 0001", i.e., a port downlink protocol packet with a destination address (DA) of 0x80000x00000x00000x000b is oriented to port 0;
 "00 0000 0000 0000 1100"=>"000 0000 0001", i.e., a port downlink protocol packet with a destination address (DA) of 0x80000x00000x00000x000c is oriented to port 0;
 "00 0000 0000 0000 1101"=>"000 0000 0001", i.e., a port downlink protocol packet with a destination address (DA) of 0x80000x00000x00000x000d is oriented to port 0;

"00 0000 0000 0000 1110"=>"000 0000 0001", i.e., a port downlink protocol packet with a destination address (DA) of 0x80000x00000x0000 0x000e is oriented to port 0;

"00 0000 0000 0000 1111"=>"000 0000 0001", i.e., a port downlink protocol packet with a destination address (DA) of 0x80000x00000x00000x000f is oriented to port 0;

"00 0000 0000 0001 0000"=>"000 0000 0001", i.e., a port downlink protocol packet with a destination address (DA) of 0x80000x00000x00000x0010 is oriented to port 0;

Server MSS-400 will notify change BX-008-0 to perform the following configurations in its table 0 via a port allocation packet containing port allocation information:

"00 0000 0000 0000 1001"=>"00 0000 0001", i.e., a port downlink protocol packet with a destination address (DA) of 0x80000x00000x0000 0x0009 is oriented to port 0;

"00 0000 0000 0000 1010"=>"00 0000 0010", i.e., a port downlink protocol packet with a destination address (DA) of 0x80000x00000x00000x000a is oriented to port 1;

"00 0000 0000 0000 1011"=>"00 0000 0100", i.e., a port downlink protocol packet with a destination address (DA) of 0x80000x00000x00000x000b is oriented to port 2;

"00 0000 0000 0000 1100"=>"00 0000 1000", i.e., a port downlink protocol packet with a destination address (DA) of 0x80000x00000x00000x000c is oriented to port 3;

"00 0000 0000 0000 1101"=>"00 0001 0000", i.e., a port downlink protocol packet with a destination address (DA) of 0x80000x00000x00000x000d is oriented to port 4;

"00 0000 0000 0000 1110"=>"00 0010 0000", i.e., a port downlink protocol packet with a destination address (DA) of 0x80000x00000x00000x000e is oriented to port 5;

"00 0000 0000 0000 1111"=>"00 0100 0000", i.e., a port downlink protocol packet with a destination address (DA) of 0x80000x00000x00000x000f is oriented to port 6;

"00 0000 0000 0001 0000"=>"00 1000 0000", i.e., a port downlink protocol packet with a destination address (DA) of 0x80000x00000x00000x0010 is oriented to port 7;

S10) Server MSS-400 sends port downlink protocol packets with destination addresses (DA) of 0x80000x00000x0000 0x0009, 0x80000x00000x00000x000a, 0x80000x00000x0000 0x000b, 0x80000x00000x00000x000c, 0x80000x00000x00000x000d, 0x80000x00000x0000 0x000e, 0x80000x00000x00000x000f and 0x80000x00000x00000x0010 (with an SA of 0x00000x00000x00000x0000), and according to the configuration of table 0 on server MSS-400, the port downlink protocol packets will be in turn oriented to port 0 of server MSS-400; and the port downlink protocol packets will be in turn oriented to ports 0 to 7 of switch BX-008-0 according to the configuration of table 0 on switch BX-008-0;

S11) After switch BX-008-1 receives a port downlink protocol packet (i.e., a port downlink protocol packet with a destination address of 0x80000x0000x00000x000a) from port 1 of switch BX-008-0, it sends a port uplink protocol packet (which contains the registration information of the current switch), wherein DA of the packet is 0x08000x00000x00000x0000, and SA is 0x00000x00000x00000x000a;

S12) After server MSS-400 receives the port uplink protocol packet issued by switch BX-008-1 and contrasts the source address (SA) of the uplink protocol packet and the device type, it will know that port 1 of BX-008-0 is connected with an access switch, and then the information of the switch is found in the internal registration information table of the server, and a network access command is sent to the access switch (informing that the access network address thereof is 0x000a);

S13) After switch BX-008-1 receives the network access command and knows that its own access network address is 0x000a, it accesses the network, then its table 0 "00 0000 0000 0000 1010" is configured as "01 0000 0000", and the remaining items of table 0 are configured as "00 0000 0000", that is, only the downlink protocol packet of the current switch is imported to the CPU; and at the same time, a network access command reply is sent to the server;

S14) After server MSS-400 receives the network access command reply issued by the switch, it will know that switch BX-008-1 has accessed the network, and then a device state query instruction is sent to the port each second to check whether switch BX-008-1 works normally; and at the same, a port downlink protocol packet is sent to the downlink port of switch BX-008-1 to check whether other access network devices are connected under the current access switch. If the current access switch works normally, it will send a state query reply to the server after receiving a device state query instruction. When the server does not receive a state query reply in 6 seconds, it will be considered that the access switch has been removed from the network, and no device state query instruction will be sent any longer; instead, it continues to send a query packet to the current port.

3.1.4.3 The Network Access Process of a Terminal

Figure 6:
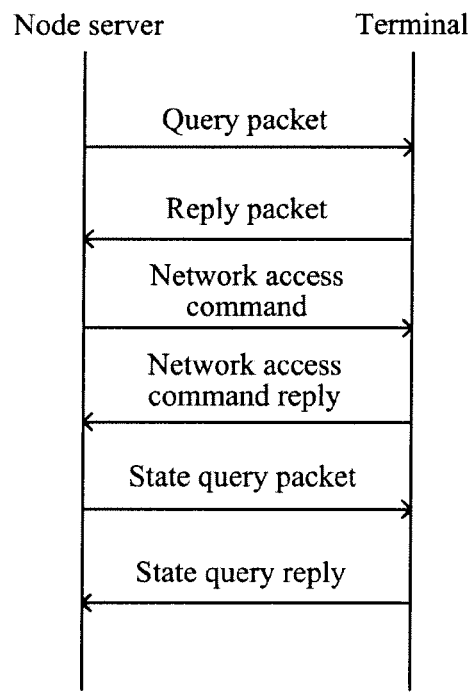
FIG. 6 is a schematic diagram showing the network access process of a terminal according to the invention.

Firstly, each terminal that is allowed to access the network must be registered on the node server, and a terminal that is not registered will be unable to access the network. As shown in FIG. 6, the process in which a terminal accesses the network relates to the following steps:

1) A node server sends a query packet to each port, and after the terminal receives the query packet, it sends a reply packet, which contains the registration information of a terminal;

2) After the node server receives the reply packet issued by the terminal, it will know what terminal (set-top box, code plate or storage) is connected under which port, then the information of the terminal is found in an internal registration information table of the node server, and a network access command is sent to the terminal (informing the access network address of the terminal), and after the terminal receives the network access command, it accesses the network and sends a network access command reply to the node server simultaneously;

3) After the node server receives the network access command reply issued by the terminal, it will know that the current terminal has accessed the network, then a state query packet is sent to the port periodically to check whether the terminal works normally. If the terminal works normally, after it receives the state query packet, it will sends a state query reply to the node server. When no state query reply is received by the node server in a certain period of time, it will be considered that the current terminal has been removed from the network, and no state query packet will be sent any longer; instead, it continues to send a query packet to the current port.

3.1.4.4 An Example of the Interaction Between a Node Server and an Access Switch, a Terminal During a Network Access Process:

The access network address may be set as 16 bits, and all access network devices have a unique access network address (including set-top box, access switch, storage and even the node server itself). For convenient management of the access network addresses of all access network devices, an address information table may be maintained in the CPU module of the node server, the size of which is the sixteenth power of two, i.e., 64K, and each item of the table is consisted as follows:

1) address occupation descriptor: "00" represents that the address is not used, "01" represents that the address is standby (the node server uses the address to issue a port downlink protocol packet, but no network access uplink protocol packet is received), and "10" represents that the address is used (which is set after the node server receives a network access uplink protocol packet);

2) device descriptor: for example, "000000" represents node server, "000001" represents access switch BX-008, "000010" represents a storage, and "000011" represents a terminal;

3) device resource description information: for example, the access network address of a device connected with its network port and the uplink and downlink flow count of each of its network ports, if the device is an access switch; the access network address of a device connected with its network port and the uplink, the count of its read and write channels and uplink and downlink flow count of its network port, if the device is a storage; and so on. All the information is used to provide a decision-making foundation to the service process, and the information will be modified during each service process.

As shown in FIG. 3, it is hypothesized that there exists a node server MSS-400, port 0 thereof is connected with an access switch BX-008-0, port 1 thereof is connected with an access switch BX-008-1, and port 0 of BX-008-0 is connected with a set-top box STB-0, port 1 of BX_008-1 is connected with a set-top box STB-1.

S1) After server MSS-400 is powered on, it initializes the hardware, obtains the default metropolitan area network address (which is hypothesized as 0x000x00000x0000), and imports a configuration file from the hard disk to the CPU memory (for example, the registration information of an switch and the registration information of a terminal, etc.), server MSS-400 initializes the address information table and clears all items (which represents that no address is used), and server MSS-400 configures its own access network address as 0x0000, that is, item 0x0000 of the address information table is configured as follows:
- address occupation descriptor: "10" represents that the address is used;
- device descriptor: "000000" represents node server;
- device resource description information: the node server has 8 downlink 100M network interfaces in turn defined as port 0 to port 7, 1 CPU module interface defined as port 8, 1 disk array interface defined as port 9 and 1 uplink 1000M fiber interface defined as port 10, and the type of this node server is MSS-400, the access network address of a device connected with its network port is not allocated, and downlink flow count of each of its network ports is 0;
- the next available address of the address information table is 0x0001;

S2) Server MSS-400 initializes tables 0, 1, 2 and 3:
- configuring table 0 as "000 0000 0000", i.e., the transmission of all downlink protocol packets is closed;
- configuring table 1 as "001 0000 0000", i.e., all uplink protocol packets are oriented to the CPU;
- configuring tables 2 and 3 as "000 0000 0000", i.e., all unicast or multicast data packet transmission is closed;

S3) Server MSS-400 knows that it has 8 downlink ports and the next available address is 0x0001, so it configures the 8 items of table 0 respectively as:
- "00 0000 0000 0000 0001"=>"000 0000 0001", i.e., a query packet with a destination address (DA) of 0x80000x00000x00000x0001 is oriented to port 0;
- "00 0000 0000 0000 0010"=>"000 0000 0010", i.e., a query packet with a destination address (DA) of 0x80000x00000x0000 0x0002 is oriented to port 1;
- "00 0000 0000 0000 0011"=>"000 0000 0100", i.e., a query packet with a destination address (DA) of 0x80000x00000x0000 0x0003 is oriented to port 2;
- "00 0000 0000 0000 0100"=>"000 0000 1000", i.e., a query packet with a destination address (DA) of 0x80000x00000x0000 0x0004 is oriented to port 3;
- "00 0000 0000 0000 0101"=>"000 0001 0000", i.e., a query packet with a destination address (DA) of 0x80000x00000x0000 0x0005 is oriented to port 4;
- "00 0000 0000 0000 0110"=>"000 0010 0000", i.e., a query packet with a destination address (DA) of 0x80000x00000x0000 0x0006 is oriented to port 5;
- "00 0000 0000 0000 0111"=>"000 0100 0000", i.e., a query packet with a destination address (DA) of 0x80000x00000x0000 0x0007 is oriented to port 6;
- "00 0000 0000 0000 1000"=>"000 1000 0000", i.e., a query packet with a destination address (DA) of 0x80000x0000 0x0000 0x0008 is oriented to port 7;

S4) Server MSS-400 sends query packets with destination addresses (DA) of 0x8000 0x0000 0x0000 0x0001, 0x8000 0x0000 0x0000 0x0002, 0x8000 0x0000 0x0000 0x0003, 0x8000 0x0000 0x0000 0x0004, 0x8000 0x0000 0x0000 0x0005, 0x8000 0x0000 0x0000 0x0006, 0x8000 0x00000x0000 0x0007, 0x80000x00000x0000 0x0008 (with an SA of 0x00000x00000x0000 0x0000), and according to the configuration of its table 0, the query packets will be in turn oriented to ports 0 to 7; at this point, items 0x0001 to 0x0008 of the address information table are configured as:
- address occupation descriptor: "01" represents that the address is standby;
- device descriptor: it will not be modified;
- device resource description information: it will not be modified;

The next available address of the address information table is 0x0009;

S5) After switches BX-008-0 and BX-008-1 are powered on, they initializes the hardware:
- configuring its table 0"00 xxxx xxxx xxxx xxxx" as "01 0000 0000", i.e., all downlink protocol packets are oriented to the CPU;
- configuring its table 1"01 xxxx xxxx xxxx xxxx" as "10 0000 0000", i.e., all uplink protocol packets are oriented to the uplink 100M network interface;
- configuring its tables 2 and 3 as "00 0000 0000", i.e., all unicast or multicast data packet transmission is closed;

S6) After switch BX-008-0 receives a query packet, it receives the query packet to its CPU module according to the configuration of its table 0, the CPU module resolves the query packet and generates a reply packet (which contains the registration information of the current access switch) and sends it to server MSS-400, wherein DA of the packet is 0x08000x00000x0000 0x0000, and SA is 0x00000x00000x00000x0001;

S7) After server MSS-400 receives the reply packet issued by switch BX-008-0 and contrasts the source address (SA) of the reply packet and the device type, it will know that its port 0 is connected with an access switch, then the information of the access switch is found in an internal registration information table of the node server, and a network access command is sent to the access switch (informing that the access network address thereof is 0x0001);

S8) After switch BX-008-0 receives the network access command and knows that its own access network address is 0x0001, it accesses the network, then its table 0"00 0000 0000 0000 0001" is configured as "01 0000 0000", and the remaining items of table 0 are configured as "00 0000 0000", that is, only the downlink protocol packet of the current switch is imported to the CPU; and at the same time, a network access command reply is sent to the server;

S9) After server MSS-400 receives the network access command reply issued by switch BX-008-0, it will know that switch BX-008-0 has accessed the network, then item 0x0001 of the internal address information table of the server is configured as:
 address occupation descriptor: "10" represents that the address is used;
 device descriptor: "000001" represents an access switch BX-008;
 device resource description information: the access switch has 8 downlink 100M network interfaces defined in turn as port 0 to port 7, 1 CPU module interface defined as port 8 and 1 uplink 100M network interface defined as port 9, the type of the access switch is BX-008, the access network address of the device connected with its uplink network port is 0x0000 (i.e., MSS-400), the access network address of the device connected with the downlink network port is not allocated, and downlink flow count of each of its network ports is 0;
 then, a device state query instruction is sent to the port each second to check whether switch BX-008-0 works normally; and at the same, a port downlink protocol packet is sent to the downlink port of switch BX-008-0 to check whether other access network devices are connected under the current access switch. In such a case, the following configurations will be done by server MSS-400 in its table 0:
 "00 0000 0000 0000 1001"=>"000 0000 0001", i.e., a port downlink protocol packet with a destination address (DA) of 0x80000x00000x0000 0x0009 is oriented to port 0;
 "00 0000 0000 0000 1010"=>"000 0000 0001", i.e., a port downlink protocol packet with a destination address (DA) of 0x80000x00000x00000x000a is oriented to port 0;
 "00 0000 0000 0000 1011"=>"000 0000 0001", i.e., a port downlink protocol packet with a destination address (DA) of 0x80000x00000x00000x000b is oriented to port 0;
 "00 0000 0000 0000 1100"=>"000 0000 0001", i.e., a port downlink protocol packet with a destination address (DA) of 0x80000x00000x00000x000c is oriented to port 0;
 "00 0000 0000 0000 1101"=>"000 0000 0001", i.e., a port downlink protocol packet with a destination address (DA) of 0x80000x00000x00000x000d is oriented to port 0;
 "00 0000 0000 0000 1110"=>"000 0000 0001", i.e., a port downlink protocol packet with a destination address (DA) of 0x80000x00000x00000x000e is oriented to port 0;
 "00 0000 0000 0000 1111"=>"000 0000 0001", i.e., a port downlink protocol packet with a destination address (DA) of 0x80000x00000x00000x000f is oriented to port 0;
 "00 0000 0000 0001 0000"=>"000 0000 0001", i.e., a port downlink protocol packet with a destination address (DA) of 0x80000x00000x00000x0010 is oriented to port 0;

Server MSS-400 will notify change BX-008-0 to perform the following configurations in its table 0 via a port allocation packet containing port allocation information:
 "00 0000 0000 0000 1001"=>"00 0000 0001", i.e., a port downlink protocol packet with a destination address (DA) of 0x80000x00000x0000 0x0009 is oriented to port 0;
 "00 0000 0000 0000 1010"=>"00 0000 0010", i.e., a port downlink protocol packet with a destination address (DA) of 0x80000x00000x00000x000a is oriented to port 1;
 "00 0000 0000 0000 1011"=>"00 0000 0100", i.e., a port downlink protocol packet with a destination address (DA) of 0x80000x00000x00000x000b is oriented to port 2;
 "00 0000 0000 0000 1100"=>"00 0000 1000", i.e., a port downlink protocol packet with a destination address (DA) of 0x80000x00000x00000x000c is oriented to port 3;
 "00 0000 0000 0000 1101"=>"00 0001 0000", i.e., a port downlink protocol packet with a destination address (DA) of 0x80000x00000x00000x000d is oriented to port 4;
 "00 0000 0000 0000 1110"=>"00 0010 0000", i.e., a port downlink protocol packet with a destination address (DA) of 0x80000x00000x00000x000e is oriented to port 5;
 "00 0000 0000 0000 1111"=>"00 0100 0000", i.e., a port downlink protocol packet with a destination address (DA) of 0x80000x00000x00000x000f is oriented to port 6;
 "00 0000 0000 0001 0000"=>"00 1000 0000", i.e., a port downlink protocol packet with a destination address (DA) of 0x80000x00000x00000x0010 is oriented to port 7;

S10) Server MSS-400 sends port downlink protocol packets with destination addresses (DA) of 0x80000x00000x0000 0x0009, 0x80000x00000x00000x000a, 0x80000x00000x0000 0x000b, 0x80000x00000x00000x000c, 0x80000x00000x00000x000d, 0x80000x00000x0000 0x000e, 0x80000x00000x00000x000f, 0x80000x00000x0000 00010 (with an SA of 0x0000 0x00000x00000x0000), and according to the configuration of table 0 on server MSS-400, the port downlink protocol packets will be in turn oriented to port 0 of server MSS-400; the port downlink protocol packets will be in turn oriented to ports 0 to 7 of switch BX-008-0 according to the configuration of table 0 on switch BX-008-0; moreover, items 0x0009 to 0x0010 of the address information table on server MSS-400 are configured as:
 address occupation descriptor: "01" represents that the address is standby;
 device descriptor: it will not be modified;

device resource description information: it will not be modified;

The next available address is 0x0011;

S11) After STB-0 receives a port downlink protocol packet from port 0 of switch BX-008-0 (i.e., a port downlink protocol packet with a destination address of 0x80000x0000 0x0000 0x0009), it sends a port uplink protocol packet (which contains the registration information of the current terminal), wherein DA of the packet is 0x08000x00000x00000x0000, and SA is 0x00000x00000x0000 0x0009 (port 0 of the switch);

S12) After server MSS-400 receives the port uplink protocol packet issued by switch STB-0 and contrasts the source address (SA) of the uplink protocol packet and the device type, it will know that port 0 of BX-008-0 is connected with a terminal, then the terminal information is found in the internal registration information table of the server, and a network access command is sent to the terminal (informing that the access network address of the terminal is 0x0009);

S13) After STB-0 receives the network access command and knows that its own access network address is 0x0009, it accesses the network and sends a network access command reply to the server simultaneously;

S14) After server MSS-400 receives the network access command reply issued by STB-0, it will know that switch STB-0 has accessed the network, then item 0x0009 of the address information table is configured as:

address occupation descriptor: "10" represents that the address is used;

device descriptor: "000011" represents a terminal;

device resource description information: the terminal has a video and audio coding/decoding engine and a 100M network interface, the type of the terminal is STB, the access network address of a device connected with its network port is 0x0001 (i.e., BX-008-0), and the downlink flow count of its network port is 0;

Item 0x0001 of the address information table is configured as:

address occupation descriptor: it will not be modified;

device descriptor: it will not be modified;

device resource description information: the access switch has 8 downlink 100M network interfaces defined in turn as port 0 to port 7, 1 CPU module interface defined as port 8 and 1 uplink 100M network interface defined as port 9, the type of the access switch is BX-008, the access network address of the device connected with its uplink network port is 0x0000 (i.e., MSS-400), the access network address of the device connected with the downlink network port 0 is 0x0009, the rest is not allocated, and downlink flow count of each of its network ports is 0;

Then, server MSS-400 sends a device state query instruction to the port each second to check whether STB-0 works normally, when the server does not receive a state query reply in 6 seconds, it will be considered that STB-0 has been removed from the network, and no device state query instruction will be sent any longer; instead, it continues to send a query packet to the current port.

Referring to the above steps S6-S14, BX-008-1 may also access the network and obtain its access network address as 0x0002; and STB-1 may also access the network and obtain its access network address as 0x0012.

3.1.5 The Definition of Data Format During the Network Access Process of an Access Network Device:

The information interaction mode between the user terminal and the server is PDU, and both use Raw Socket to transfer PDU, the data format of which is as follows:

| Destination Address | Source Address | Reserved Byte | PDU |
|---|---|---|---|
| 4W | 4W | 2 BYTE | 32W or 528W |

System Message (PDU) Definition
Firstly, Port Query
1) Port query instruction which is send by the server and is a short instruction of 32W:

| Field Number | Length | Code | Description |
|---|---|---|---|
| 0 | 1W | 8A01 | port query instruction of server |
| 1-4 | 4W | | network address |
| 5-7 | 3W | | system clock |
| 8-9 | 2W | | IP address of gateway (this field is only valid for terminal) |
| 10-12 | 3W | | MAC address of gateway (this field is only valid for terminal) |
| 13-31 | 19W | 0000 | to be filled |

2) Port query reply instruction which is a short instruction of 32W:

The STB receives the reply transmitted from 8A01 to the server

| Field Number | Length | Code | Description |
|---|---|---|---|
| 0 | 1W | 8A03 | port query reply instruction of UE |
| 1 | 1W | | device type (0x2131) |
| 2-4 | 3W | | terminal device identifier (different for each terminal) |
| 5-8 | 4W | | network address (obtained form 8A01) |
| 9-11 | 3W | 0000 | UE number (fill 0) |
| 12 | 1W | 0000 | UE extension number (fill 0) |
| 13-15 | 3W | | terminal version information (used to distinguish position of STB program in server) |
| 16-31 | 16W | 0000 | to be filled |

The switch receives the reply transmitted from 8A01 to the server

| Field Number | Length | Code | Description |
|---|---|---|---|
| 0 | 1W | 8A02 | port query reply instruction of switch |
| 1 | 1W | | device type |
| 2-4 | 3W | | device identifier (different for each switch) |
| 5-8 | 4W | | network address (obtained form 8A01) |
| 9 | 1W | | rated flow of main line (inherent in switch) |
| 10 | 1W | | rated flow of branch line (inherent in switch) |
| 11-13 | 3W | | version information (inherent in switch) |
| 14-31 | 18W | 0000 | fill 0 |

The encoding plate receives the reply transmitted from 8A01 to the server

| Field Number | Length | Code | Description |
|---|---|---|---|
| 0 | 1W | 8A06 | port query reply instruction of encoding plate |
| 1 | 1W | | device type (0x5131) |
| 2-4 | 3W | | device identifier (different for each) |

-continued

| Field Number | Length | Code | Description |
|---|---|---|---|
| 5-8 | 4W | | network address (obtained form 8A01) |
| 9-31 | 23W | 0000 | to be filled |

Device identifier: it can be valued temporarily as 0x5131 0201 000X (X=0-f)

3) Network access instruction which is send by the server and is a short instruction of 32W:

| Field Number | Length | Code | Description |
|---|---|---|---|
| 0 | 1W | 8A11 | network access instruction of server |
| 1 | 1W | | device type |
| 2-4 | 3W | | device identifier |
| 5-8 | 4W | | network address |
| 9-11 | 3W | | device number and UE number |
| 12 | 1W | | UE extension number, or dedicated HOP number of TWG |
| 13-31 | 19W | 0000 | to be filled |

4) Network access confirmation instruction which is a short instruction of 32W:

| Field Number | Length | Code | Description |
|---|---|---|---|
| 0 | 1W | 8A12 | network access confirmation instruction |
| 1 | 1W | | device type |
| 2-4 | 3W | | device identifier |
| 5-10 | 6W | | device model number (supplementary information, ASCII code) |
| 11-13 | 3W | | UE number (obtained form 8A11) |
| 14 | 1W | | UE extension number (obtained form 8A11) |
| 15-18 | 4W | | network address (obtained form 8A01) |
| 19-31 | 13W | 0000 | to be filled |

5) State query instruction which is send by the server and is a short instruction of 32W:

The state query instruction transmitted to the switch

| Field Number | Length | Code | Description |
|---|---|---|---|
| 0 | 1W | 8A21 | state query instruction of switch |
| 1 | 1W | | device type |
| 2-4 | 3W | | device identifier |
| 5-8 | 4W | | network address |
| 9 | 1W | | device number |
| 10-12 | 3W | | real-time clock (maintained by server) |
| 13-17 | 5W | | to be filled |
| 18-19 | 2W | | IP address (useful only for gateway) |
| 20-22 | 3W | | MAC address (useful only for gateway) |
| 23 | 1W | | serial number of MAC (useful only for gateway) |
| 24-31 | 8W | | to be filled |

The state query instruction transmitted to the STB

| Field Number | Length | Code | Description |
|---|---|---|---|
| 0 | 1W | 8A31 | state query instruction of STB |
| 1-4 | 4W | | network address |
| 5-7 | 3W | | real-time clock (maintained by server) |
| 8-10 | 3W | | STB number |
| 11-31 | 21W | 0000 | to be filled |

6) State query reply instruction which is a short instruction of 32W:

State query reply of the switch

| Field Number | Length | Code | Description |
|---|---|---|---|
| 0 | 1W | 8A22 | state query reply instruction of switch |
| 1 | 1W | | device type |
| 2-4 | 3W | | device identifier |
| 5-6 | 2W | | to be filled |
| 7 | 1W | | device number |
| 8 | 1W | | to be filled |
| 9 | 1W | | working state of switch |
| 10 | 1W | | temperature |
| 11 | 1W | | actual uplink measured flow of main line |
| 12 | 1W | | actual downlink measured flow of main line |
| 13-31 | 19W | | to be filled |

State query reply of the STB

| Field Number | Length | Code | Description |
|---|---|---|---|
| 0 | 1W | 8A23 | state query reply instruction of UE |
| 1 | 1W | | device type |
| 2-4 | 3W | | device identifier |
| 5-7 | 3W | | UE number |
| 8 | 1W | | UE extension number |
| 9 | 1W | | state of terminal device (= 0 normally) |
| 10 | 1W | | environment temperature of UE |
| 11 | 1W | | type of device connected by terminal |
| 12 | 1W | | on-off state of device connected by terminal, 0 = off, and 1 = on |
| 13-30 | 18W | | the same as 11-12 |
| 31 | 1W | | CRC |

State query reply of the encoding plate

| Field Number | Length | Code | Description |
|---|---|---|---|
| 0 | 1W | 8A26 | state query reply instruction of encoding plate |
| 1 | 1W | | device type |
| 2-4 | 3W | | device identifier |
| 5-7 | 3W | | device number |
| 8 | 1W | | to be filled |
| 9 | 1W | | working state of encoding plate |
| 10 | 1W | | temperature of encoding plate |
| 11-31 | 21W | | to be filled |

Thirdly, the advantages of the embodiments of the invention will be further described below by comparing with IP Internet.

1) Impersonation may be prevented fundamentally on network address structure.

A user device informs the network of its IP Internet address; but in the invention, the network informs the user device of the novel network address.

To prevent others from intruding, the PC and Internet set a complex password and secret code barrier. Even for a real-name address, it still cannot be avoided that the secret code is deciphered or the security information of the user leaks out due to user's inadvertency. A PC terminal connected to the IP Internet must give a self-introduction first and inform the network of its IP address. However, who can guarantee that the IP address is true? This will be the first loophole of IP Internet that cannot be overcome.

In the novel network of the invention, the address of a terminal is learnt via network management protocol, and the user terminal can only access the novel network of the invention via this address that is learnt. Therefore, it can be ensured without authentication. A detailed description thereof may refer to network management protocol. The novel network of the invention creates a "colored" address system with an ordered structure (D/SCAF). The novel network address of the invention not only has uniqueness, but also has a function of being locatable and characterizable; for example, similar to ID card number, it implies the geographic position of user port, device attribute, service right and other characteristics. A switch on the novel network of the invention specifies a rule of conduct for the packets according to these characteristics, thus data distribution with different attribute may be realized.

2) An independent passport is issued for each service, so that the path for hacker attack and virus diffusion can be blocked.

A user can enter and exit the IP Internet freely, and a user prepares a firewall by himself/herself; but in the novel network of the invention, a passport must be requested for each service.

On the IP network, because a communication protocol is executed on a user terminal, it may be tampered. Route information is broadcast on the network, so it may be intercepted. Various intrinsic defects of IP network, for example, address spoofing, anonymous attack, mail bomb, teardrop, hidden monitoring, port scanning, internal intruding and information altering, etc., provide a stage for hackers. It is difficult to prevent Internet pollutions, such as junk mail, etc.

Because a user on the IP Internet may set any IP address to personate another user, a probe may be sent to any device on the network to snoop the information thereof, and any interference packet may be sent to the network (foul water casting). Therefore, various firewalls are invented. However, the installation of a firewall is voluntary, and the effect of a firewall is temporary and relative, because the IP Internet itself will never be clean. This is the second security defect of IP Internet that cannot be overcome.

In the novel network of the invention, after a user accesses the network, the network switch only allows the user to issue limited service requests to a node server, and all other packets will be shut down. If the node server authorizes the user request, it issues a network passport to the switch on which the user exists, and if a packet issued by the user terminal does not meet the authentication condition on the network switch end, it will be discarded, thus hacker attack can be avoided. Each time a service ends, the passport will be cancelled automatically. The passport mechanism is executed by the switch, which is outside the control range of a user.

Authentication of user packet source address: it can prevent a user from sending any imitated or anonymous packet (which is automatically set after network access).

Authentication of destination address: a user can only send a packet to an object designated by the server (which is determined during service request).

Authentication of data traffic: data traffic sent by a user must meet a specification of the server (which is determined during service request).

Authentication of copyright identification: it prevents a user from forwarding a content with a copyright that is downloaded from the network (which is set by a content provider).

Passive measures such as firewall, antivirus, encryption and isolation between internet and intranet, etc., will not be needed on the novel network of the invention, and the novel network of the invention blocks the approach of hacker attack and virus diffusion on the network structure. Therefore, it may be secure network essentially.

3) Network device and user data are completely isolated, thus the lifeline of virus and Trojan can be cut off.

An IP Internet device may dismantle a user packet freely; but the novel network device of the invention is completely isolated from the user data. That is, during data transmission, a novel network device (for example, switch and gateway, etc.) dose not dismantle user packet; instead, it looks up in a mapping table according to the packet address, and then forwards it from the corresponding port. That is, the switch of the invention does not have the function of route calculation and selection.

The computer created by Von Neumann put program instructions and operating data in the same place, that is, a segment of program may modify other programs and data in the machine. Such a computer mode still in use today gives an opportunity to Trojan, worm, virus and backdoor, etc. With the rapid accumulation of virus, the antivirus software and patch always lag behind, so they will be in a passive state.

The technical core of Internet TCP/IP protocol is Best Efforts, Store & Forward and Error Detection & Retransmission. To complete the mission of Internet, the network server and router must have the ability of user packet resolution, which leaves a way to hacker and virus. Thus, network security becomes an Indian wrestling in which the smarter one will win for the moment. This is the third defect of IP Internet that is inherited.

On the novel network of the invention, it is impossible for the CPUs of all servers and switch devices to touch the user packet of any user. That is, the whole novel network of the invention only establishes a transparent pipeline with specified flow and behaviors, which is completely isolated, between the terminal devices of the service-providing party and the service-receiving party. Whatever are received or sent by a user terminal, it has nothing to do with the network. The lifeline of virus and Trojan is cut off on the structure. Therefore, an end may be put to the possibility of stealing user data on the network; by the same token, those who attempts to be a hacker or make a virus will have no object to attack.

4) Free connection between users are completely isolated, so that effective management may be ensured.

IP Internet is a free market and has no middleman; the novel network of the invention is a department store and has middlemen. For the network, consumers and content providers both belong to the category of network users, except for different scales. IP Internet is a free market that will not be managed, and communication may be conducted directly between any users (P2P). That is, it is determined by users whether management is needed, it is determined by unilateral large users (providers) whether it is charged, and it is determined by unilateral large users (vampire websites) whether laws and regulations are to be complied with. The operator can at most collect an entrance fee, and it will be Arabian Nights that the operator conducts legal, moral, security or commercial rules, neither now nor in the future. This is the fourth disability of IP Internet on structure.

In the novel network of the invention, it creates a concept of service node, and it forms a department store commercial mode that is managed. Free contact is impossible between users or between consumers and providers, and all contacts must be authorized by a node server (middleman), which is a necessary condition to realize the effective management of network services. If one wants to be a novel network user, he/she must negotiate a role with the network operator; for example, from ordinary consumer to network store, school, hospital, government department, or even TV station, they are all clients of the operator, just as that the above are all clients of the telephone company. It seems that each role on the network just receives and sends a video content, however, for the receiving and sending of the video content, it must strictly comply with certain behavior rules that are negotiated. Only with specifications that must be complied with, can the relation between various users become C2C, B2C, B2B and so on in a true sense, or called managed user-to-user communication (MP2P).

5) Commercial rules are implanted into the communication protocol to ensure a profit-gaining mode;

IP Internet follows a mode of communication first; while the novel network of the invention follows a mode of management first.

For IP Internet, illegal media contents can only be sequestrated partially after a serious affect is caused, but it cannot be prevented in advance. "Professional attacks" that are systematically organized and planned cannot be prevented by law and morality; moreover, one can only be punished by law after others are harmed. The IP Internet defines management as an additional service, which is established on the application layer. Therefore, it is certain that management becomes an ornament which may exist or not. This is the fifth nature of IP Internet that cannot be changed.

In the novel network of the invention, a user terminal can only select to apply one of the services designated by the node server. The protocol signaling during the service establishing process is executed by the node server (without being processed by the user). The user terminal only answers the questions of the server passively, and accepts or rejects the service, and it cannot participate in the protocol process. Once the user accepts the service provided by the server, it will only be able to send a packet according to the mode specified by the passport, and any packet departing from the passport will be discarded in a bottom-layer switch. The basic concept of the novel network protocol according to the invention is to realize a commercial mode with a core of service content, rather than performing simple data communication. In such a mode, security will be an intrinsic attribute of the novel network, rather than being an additional service appended to the network. Of course, service right authentication, resource confirmation and charging procedure, etc., all may be easily contained in the arrangement contract.

The device embodiments of the invention related to a communication connection system for an access network device, a node server and an access switch basically correspond to the above method embodiments, and reference may be made to the related description of the above method embodiments, so it will not be described again here.

It should be noted that, in this specification, relation terms such as first, second and so on are only used to distinguish one entity or operation from another entity or operation, rather than requiring or implying that such an actual relation or sequence exists between these entities or operations.

A communication connection method for an access network device, a communication connection system for an access network device, a node server and an access switch according to the invention have been described in detail above. Theory and embodiments of the invention are illustrated with specific examples, and the description of the above embodiments only aims to help one skilled in the art to understand the method of the invention and its core concept; at the same time, various modifications and variations may be made by those skilled in the art without departing from the scope of the invention. In conclusion, the contents of the specification should not be construed as limiting the scope of the invention.

What is claimed is:

1. A communication connection method for an access network device, wherein the access network device comprises a node server, an access switch and a terminal, and the method comprises:
   acquiring, by the node server, a service request initiated by a source terminal comprising a unicast communication service request and communication link information of current service according to a service request protocol packet initiated by the source terminal by:
      obtaining, by the node server, the service request protocol packet initiated by the source terminal for establishing unicast communication service with a target terminal, wherein the service request protocol packet includes service type information, service content information and an access network address of the source terminal, wherein the service content information includes a service number;
      extracting, by the node server, an access network address of the target terminal from a preset content-address mapping table according to the service number;
      acquiring, by the node server, the communication link information of the current service according to the service type information, the access network address of the source terminal and the access network address of the target terminal; and
      wherein the communication link information is unidirectional communication link information or bidirectional communication link information and comprises communication port information of the access switch which participates in the current service; and
      determining, by the node server, that a data packet address table set currently is a unicast data packet address table according to the service type information;
   transmitting, by the node server, a port configuration command to the corresponding access switch according to the communication port information of the access switch; and
   setting, by the access switch, in its internal data packet address table, a port to which a data packet of the current service is oriented, according to the port configuration command, wherein the internal data packet address table of the access switch comprises a unicast data packet address table; and
   setting, by the node server, in its internal data packet address table, a port to which the data packet of the current service is oriented; and
   wherein if the source terminal and a target terminal being connected to a same access switch, the node server configures a data packet orientation port of the access switch, and does not configure a data packet orientation port of the node server, and when a service communication being carried out between the source terminal and the target terminal being connected to the same access switch, the access switch transmits a data packet via a corresponding downlink port of the access switch according to settings of the internal data packet address table of the access switch, without transmitting the data packet to the node server.

2. The method of claim 1, wherein the step of acquiring, by the node server, the communication link information of the current service further comprises:

transmitting, by the node server, a menu protocol packet to the source terminal and the target terminal; and receiving a reply protocol packet transmitted from the target terminal for the menu protocol packet; and the step of acquiring, by the node server, the communication link information of the current service further comprises:

orienting the menu protocol packet to the source terminal according to settings of a preset protocol packet address table in an access switch between the node server and the source terminal; and orienting the menu protocol packet to the target terminal according to settings of a preset protocol packet address table in an access switch between the node server and the target terminal;

wherein the protocol packet address table is set with a CPU module, to which a protocol packet with a destination address being an access network address of the current access switch is oriented, and a port, to which a protocol packet with a destination address being an address of another access network device is oriented.

3. The method of claim 1, wherein the port, to which a unicast data packet of the current service is oriented and which is set by the node server in its internal unicast data packet address table, comprises:

a downlink port to which a unicast data packet with a destination address being the source terminal is oriented; and a downlink port to which a unicast data packet with a destination address being the target terminal is oriented;

when the communication link information is unidirectional communication link information, the communication port information of the access switch comprises uplink port information of the access switch in an uplink and downlink port information of the access switch in a downlink;

the port, to which the unicast data packet of the current service is oriented and which is set by the access switch in its internal unicast data packet address table according to the port configuration command, comprises:

an uplink port of the access switch in the uplink and a downlink port of the access switch in the downlink to which a unicast data packet with a destination address being the target terminal is oriented; and when the communication link information is bidirectional communication link information, the communication port information of the access switch comprises uplink port and downlink port information of the access switch in an uplink and uplink port and downlink port information of the access switch in a downlink;

the port, to which the unicast data packet of the current service is oriented and which is set by the access switch in its internal unicast data packet address table according to the port configuration command, comprises:

an uplink port and a downlink port of the access switch in the uplink to which a unicast data packet with a destination address being the target terminal is oriented; and an uplink port and a downlink port of the access switch in the downlink to which a unicast data packet with a destination address being the source terminal is oriented.

4. The method of claim 1, wherein the service request initiated by the source terminal comprises a multicast communication service request, the data packet address table comprises a multicast data packet address table, and the step of acquiring, by the node server, the communication link information of the current service comprises:

obtaining, by the node server, a service request protocol packet initiated by the target terminal for requesting multicast communication service, wherein the service request protocol packet comprises service type information, service content information and an access network address of the target terminal, wherein the service content information comprises a service number;

extracting, by the node server, an access network address of the source terminal from a preset content-address mapping table according to the service number; and acquiring, by the node server, a multicast address corresponding to the source terminal, and allocating the multicast address to the target terminal; and acquiring the communication link information of the current multicast service according to the service type information, the access network address of the source terminal and the access network address of the target terminal.

5. The method of claim 4, wherein the step of acquiring, by the node server, the communication link information of the current service further comprises:

obtaining, by the node server, a service request protocol packet submitted by the source terminal for initiating multicast communication service, and allocating a multicast address to the source terminal according to the service request protocol packet, wherein the service request protocol packet comprises service type information, service content information and an access network address of the source terminal, wherein the service content information comprises a service number; and acquiring uplink communication link information of the current multicast service according to the service type information and the access network addresses of the node server and the source terminal; and wherein the step of acquiring, by the node server, the communication link information of the current service further comprises:

acquiring downlink communication link information of the current multicast service according to the service type information and the access network addresses of the node server and the source terminal.

6. The method of claim 4, further comprising:

determining, by the node server, that the data packet address table set currently is a multicast data packet address table according to the service type information;

wherein the port, to which a multicast data packet of the current service is oriented and which is set by the node server in its internal multicast data packet address table, comprises:

a downlink port to which a multicast data packet with a destination address being the multicast address is oriented;

the communication port information of the access switch comprises uplink port information of the access switch in an uplink and downlink port information of the access switch in a downlink;

the port, to which a multicast data packet of the current service is oriented and which is set by the access switch in its internal multicast data packet address table according to the port configuration command, comprises:

an uplink port of the access switch in the uplink and a downlink port of the access switch in the downlink to which a multicast data packet with a destination address being the multicast address is oriented;

the communication port information of the access switch further comprises downlink port information of the access switch in an uplink;

the port, to which a multicast data packet of the current service is oriented and which is set by the access switch in its internal multicast data packet address table according to the port configuration command, comprises:

a downlink port of the access switch in the uplink to which a multicast data packet with a destination address being the multicast address is oriented; and the port configuration command is recorded in a protocol packet, and the node server orients the protocol packet to a corresponding access switch by connecting to a downlink port of the corresponding access switch according to settings of a downlink protocol packet address table preset internally;

wherein the downlink protocol packet address table is set with a downlink port to which a protocol packet with a destination address being an address of a subordinate access network device is oriented.

7. The method of claim 1, wherein the step of acquiring, by the node server, the communication link information of the current service further comprises:

if many pieces of communication link information of the current service are obtained, selecting, by the node server, one of the pieces of communication link information as the communication link information of the current service according to a preset rule, wherein the preset rule is that the node server acquires flow information of each communication link and flow information of the current service, and determines the information of a communication link with the minimum flow used as the communication link information of the current service; or the preset rule is that the node server acquires bandwidth information of each communication link and bandwidth information of the current service, and determines the information of a communication link with the maximum bandwidth as the communication link information of the current service.

8. The method of claim 1, further comprising:

releasing, by the node server, the port, to which the data packet of the current service is oriented and which is set in its internal data packet address table, after the current service is completed, and transmitting a port release command to the access switch that participates in the current service; and releasing, by the access switch, the port, to which the data packet of the current service is oriented and which is set in its internal data packet address table, according to the port release command;

wherein the method further comprises:

transmitting, by the node server, a service ending command to the source terminal and/or the target terminal; and ending, by the source terminal and/or the target terminal, the service processing according to the service ending command;

wherein the node server is further set with an address information table therein, wherein address occupation information, device identification information and device resource information are recorded in the address information table;

wherein the method further comprises:

modifying, by the node server, contents in the preset address information table, wherein the modifying comprises: updating the address occupation information in the corresponding item of the released port as not occupied; and updating the corresponding device identification information and device resource information.

9. The method of claim 1, further comprising:

setting, by the access switch, a CPU module, to which all downlink protocol packets are oriented, in its internal downlink protocol packet address table when being powered on;

receiving, by the access switch, a downlink protocol packet transmitted from the node server and orienting the downlink protocol packet to the CPU module of the access switch according to settings of the downlink protocol packet address table; and generating, by the CPU module, an uplink protocol packet and transmitting the uplink protocol packet to the node server, wherein the downlink protocol packet contains an access network address to be allocated;

transmitting, by the node server, a network access command to the access switch, wherein the network access command contains an access network address of the access switch, and the access network address is the access network address to be allocated in the downlink protocol packet received by the access switch; and updating, by the access switch, its internal downlink protocol packet address table as that only a protocol packet with a destination address being its own access network address is oriented to the CPU module.

10. The method of claim 9, wherein when the access switch which has accessed the network receives a port allocation packet transmitted from the node server, the method further comprises:

orienting, by the access switch which has accessed the network, the port allocation packet with a destination address being its own access network address to the CPU module; and setting, in its internal downlink protocol packet address table, a downlink port to which each port downlink protocol packet is oriented according to port allocation information in the packet; and when the access switch which has accessed the network receives a port downlink protocol packet transmitted from the node server, the method further comprises:

orienting, by the access switch, the port downlink protocol packet to a corresponding downlink port according to settings of its internal downlink protocol packet address table, wherein the port downlink protocol packet contains an access network address to be allocated;

receiving, by the node server, a port uplink protocol packet transmitted from a certain subordinate access network device connected to a downlink port of the access switch, and transmitting a network access command to the subordinate access network device, wherein the network access command contains an access network address of the subordinate access network device, and the access network address is the access network address to be allocated in the port downlink protocol packet received by the subordinate access network device.

11. A communication connection system for an access network device, the access network device is located in a novel network, the novel network is a centrally controlled network, comprising a node server, an access switch, an address table configuration module, and a terminal, wherein the node server is a node, having a centralized control function, on an access network, and the node server can control the access switch and the terminal, wherein the access network device comprises a node server, an access switch and a terminal, and the node server comprises at least one processor, wherein the at least one processor of the node server is configured to receive a service request initiated by a source terminal comprising a unicast communication service request according to a service request protocol packet initiated by the source terminal; and to acquire communication link information of current service according to the service request protocol packet initiated by the source terminal by:

receiving the service request protocol packet initiated by the source terminal for establishing unicast communication service with a target terminal, wherein the service request protocol packet includes service type information, service content information and an access network address of the source terminal, wherein the service content information includes a service number;

extracting, by the node server, an access network address of the target terminal from a preset content-address mapping table according to the service number;

acquiring, by the node server, the communication link information of the current service according to the service type information, the access network address of the source terminal and the access network address of the target terminal; and wherein the communication link information is unidirectional communication link information or bidirectional communication link information and comprises communication port information of the access switch which participates in the current service; and wherein the at least one processor of the node server is further configured to transmit a port configuration command to the corresponding access switch according to the communication port information of the access switch and the address table configuration module is configured to set, in an internal data packet address table of the node server, a port to which the data packet of the current service is oriented; and the access switch comprises at least one processor configured to set, in its internal data packet address table, a port to which a data packet of the current service is oriented, according to the port configuration command, wherein the internal data packet address table of the access switch comprises a unicast data packet address table; and wherein if the source terminal and a target terminal being connected to a same access switch, the node server configures a data packet orientation port of the access switch, does not configure a data packet orientation port of the node server, and when a service communication being carried out between the source terminal and the target terminal being connected to the same access switch, the access switch transmits a data packet via a corresponding downlink port of the access switch according to settings of the internal data packet address table of the access switch, without transmitting the data packet to the node server.

12. The system of claim 11, wherein the service request initiated by the source terminal comprises a multicast communication service request, the data packet address table comprises a unicast data packet address table and a multicast data packet address table, and at least one processor of the node server is further configured to transmit a service processing command to the source terminal and the target terminal respectively;

the source terminal comprises at least one processor configured to perform a corresponding operation according to the service processing command; and the target terminal comprises at least one processor configured to perform a corresponding operation according to the service processing command; and the at least one processor of the node server is further configured:

to receive a service request protocol packet initiated by the target terminal for requesting multicast communication service, wherein the service request protocol packet comprises service type information, service content information and an access network address of the target terminal, wherein the service content information comprises a service number;

to extract an access network address of the source terminal from a preset content-address mapping table according to the service number;

to acquire a multicast address corresponding to the source terminal, and allocate the multicast address to the target terminal; and configured to acquire the communication link information of the current multicast service according to the service type information, the access network address of the source terminal and the access network address of the target terminal; and to determine that the data packet address table set currently is a multicast data packet address table according to the service type information.

13. The system of claim 11, wherein the access switch is an access switch connected between the source terminal and the node server, and the at least one processor of the access switch is further configured:

to orient the service request protocol packet initiated by the source terminal to the node server via an uplink port of the access switch according to settings of its internal preset uplink protocol packet address table;

wherein the uplink protocol packet address table is set with an uplink port to which a protocol packet with a destination address being the address of the node server is oriented.

14. The system of claim 11, wherein the at least one processor of the node server is further configured to transmit a downlink protocol packet to the access switch; and to transmit a network access command according to an uplink protocol packet replied by the access switch; and the at least one processor of the access switch is further configured:

to set a CPU module, to which all downlink protocol packets are oriented, in its internal downlink protocol packet address table when being powered on;

to orient a received downlink protocol packet to the CPU module of the access switch according to settings of the downlink protocol packet address table, wherein the downlink protocol packet contains an access network address to be allocated;

to generate an uplink protocol packet by the CPU module and transmit the uplink protocol packet to the node server;

to receive a network access command transmitted from the node server, wherein the network access command contains an access network address of the access switch, and the access network address is the access network address to be allocated in the downlink protocol packet received by the access switch; and to update its internal downlink protocol packet address table as that only a protocol packet with a destination address being its own access network address is oriented to the CPU module.

15. A node server, wherein the node server is a node having a centralized control function, on an access network of a novel network, the novel network is a centrally controlled network, comprising a node server, an access switch and a terminal, and the node server can control the access switch and the terminal, wherein the node server comprises at least one processor configured:

to receive a service request initiated by a source terminal comprising a unicast communication service request and a service request protocol packet initiated by the source terminal;

to acquire communication link information of current service according to the service request protocol packet initiated by the source terminal by:

obtaining the service request protocol packet initiated by the source terminal for establishing unicast communication service with a target terminal, wherein the service request protocol packet includes service type information, service content information and an access network address of the source terminal, wherein the service content information includes a service number;

extracting an access network address of the target terminal from a preset content-address mapping table according to the service number;

acquiring the communication link information of the current service according to the service type information, the access network address of the source terminal and the access network address of the target terminal; and wherein the communication link information is unidirectional communication link information or bidirectional communication link information and comprises communication port information of the access switch which participates in the current service; and to determine that a data packet address table set currently is a unicast data packet address table according to the service type information;

to transmit a port configuration command to the corresponding access switch according to the communication port information of the access switch; and to set in an internal data packet address table of the node server, a port to which the data packet of the current service is oriented; and wherein if the source terminal and a target terminal being connected to a same access switch, the node server configures a data packet orientation port of the access switch, does not configure a data packet orientation port of the node server, so that when a service communication being carried out between the source terminal and the target terminal being connected to the same access switch, the access switch transmits a data packet via a corresponding downlink port of the access switch according to settings of a internal data packet address table of the access switch, without transmitting the data packet to the node server.

16. The system of claim 11, wherein the node server comprises a communication link acquiring module comprising:

a unicast service protocol packet receiving submodule configured to receive the service request protocol packet initiated by the source terminal for establishing unicast communication service with the target terminal, wherein the service request protocol packet includes service type information, service content information and the access network address of the source terminal, wherein the service content information includes the service number;

a target terminal address acquiring submodule configured to extract the access network address of the target terminal from the preset content-address mapping table according to the service number; and a communication link calculating submodule configured to acquire the communication link information of the current service according to the service type information, the access network address of the source terminal and the access network address of the target terminal; and a unicast address table determining module configured to determine that the data packet address table set currently is the unicast data packet address table according to the service type information.

17. The node server of claim 15, further comprising:

an address table configuration module configured to set, in its internal data packet address table, the port to which the data packet of the current service is oriented according to communication port information of the node server.

* * * * *